US011595159B2

(12) United States Patent
Ye et al.

(10) Patent No.: US 11,595,159 B2
(45) Date of Patent: Feb. 28, 2023

(54) HARQ DESIGN FOR WIRELESS COMMUNICATIONS

(71) Applicant: Apple Inc., Cupertino, CA (US)

(72) Inventors: Chunxuan Ye, San Diego, CA (US); Dawei Zhang, Saratoga, CA (US); Oghenekome Oteri, San Diego, CA (US); Wei Zeng, San Diego, CA (US); Weidong Yang, San Diego, CA (US); Haitong Sun, Cupertino, CA (US)

(73) Assignee: APPLE, INC., Cupertino, CA (US)

( * ) Notice: Subject to any disclaimer, the term of this patent is extended or adjusted under 35 U.S.C. 154(b) by 23 days.

(21) Appl. No.: 17/174,343

(22) Filed: Feb. 11, 2021

(65) Prior Publication Data
US 2021/0258104 A1  Aug. 19, 2021

Related U.S. Application Data

(60) Provisional application No. 62/976,283, filed on Feb. 13, 2020.

(51) Int. Cl.
*H04L 1/18* (2006.01)
*H04L 1/1812* (2023.01)
*H04W 76/11* (2018.01)
*H04L 1/00* (2006.01)
*H04W 72/04* (2023.01)
*H04W 72/044* (2023.01)

(52) U.S. Cl.
CPC .......... *H04L 1/1819* (2013.01); *H04L 1/0061* (2013.01); *H04W 72/042* (2013.01); *H04W 72/0466* (2013.01); *H04W 76/11* (2018.02)

(58) Field of Classification Search
CPC .. H04L 1/1819; H04L 1/0061; H04W 72/042; H04W 72/0466; H04W 76/11
See application file for complete search history.

(56) References Cited

U.S. PATENT DOCUMENTS

2010/0275083 A1   10/2010  Nam et al.
2013/0195041 A1*  8/2013  Papasakellariou .. H04W 72/042
                                                        370/329

(Continued)

OTHER PUBLICATIONS

Extended European Search Report on the Patentability of Application No. 21157064.3 dated Jun. 3, 2021. 8 pages.

*Primary Examiner* — Jael M Ulysse
(74) *Attorney, Agent, or Firm* — Womble Bond Dickinson (US) LLP

(57) ABSTRACT

Apparatuses, systems, and methods for a wireless device to disable a HARQ feedback in either a semi-static way or in a dynamic way and to perform HARQ optimization. The wireless device may be configured to receive a first set and a second set of HARQ process numbers, where the first set and the second set of HARQ process numbers correspond to a first set and a second set of HARQ processes respectively, where each HARQ process in the first set of HARQ processes is configured to enable a HARQ feedback, and where each HARQ process in the second set of HARQ processes is configured to disable or enable a HARQ feedback. The wireless device may be configured to receive a grant configuration or a SPS, where the grant configuration or the SPS include a flag indicating whether a HARQ-based retransmission is disabled.

20 Claims, 16 Drawing Sheets

(56) References Cited

U.S. PATENT DOCUMENTS

| | | | |
|---|---|---|---|
| 2016/0037524 A1* | 2/2016 | Krzymien | H04L 1/1812 |
| | | | 370/329 |
| 2017/0310447 A1* | 10/2017 | Kusashima | H04W 72/0406 |
| 2017/0332377 A1* | 11/2017 | Tseng | H04W 72/0446 |
| 2018/0019843 A1* | 1/2018 | Papasakellariou | |
| | | | H04W 72/0406 |
| 2018/0092069 A1* | 3/2018 | Suzuki | H04L 1/1864 |
| 2018/0123765 A1* | 5/2018 | Cao | H04L 1/1893 |
| 2018/0124815 A1* | 5/2018 | Papasakellariou | H04L 1/1671 |
| 2018/0139731 A1* | 5/2018 | Suzuki | H04W 72/042 |
| 2018/0323909 A1* | 11/2018 | Ying | H04L 1/1887 |
| 2018/0376496 A1* | 12/2018 | Wang | H04L 5/0091 |
| 2019/0150128 A1* | 5/2019 | Suzuki | H04W 72/042 |
| | | | 370/329 |
| 2019/0208436 A1* | 7/2019 | Zhou | H04B 7/0617 |
| 2019/0281621 A1* | 9/2019 | Noh | H04L 1/1819 |
| 2020/0037314 A1* | 1/2020 | Xiong | H04L 5/0091 |
| 2020/0213981 A1* | 7/2020 | Park | H04L 1/1864 |
| 2020/0275423 A1* | 8/2020 | Papasakellariou | H04W 72/042 |
| 2021/0050947 A1* | 2/2021 | Tsai | H04L 1/1822 |
| 2021/0083806 A1* | 3/2021 | Zou | H04W 72/0493 |
| 2021/0099254 A1* | 4/2021 | Babaei | H04L 1/1896 |
| 2021/0105101 A1* | 4/2021 | Wei | H04L 1/1864 |
| 2021/0144743 A1* | 5/2021 | Rastegardoost | H04W 72/1257 |
| 2022/0078835 A1* | 3/2022 | Hwang | H04L 1/08 |
| 2022/0086811 A1* | 3/2022 | Han | H04L 5/0055 |

\* cited by examiner

HARQ DESIGN FOR WIRELESS COMMUNICATIONS

PRIORITY

This application claims benefit of priority from U.S. Provisional Application No. 62/976,283, titled "HARQ DESIGN FOR WIRELESS COMMUNICATIONS" and filed Feb. 13, 2020, which is hereby incorporated by reference.

FIELD

This disclosure relates to the field of wireless communications, and more particularly to apparatus, systems, and methods for a wireless device to disable a hybrid automatic repeat request (HARQ) feedback and to perform HARQ optimization.

BACKGROUND

Wireless communication systems are rapidly growing in usage. Further, wireless communication technology has evolved from voice-only communications to also include the transmission of data, such as Internet and multimedia content. Thus, improvements in the field are desired.

SUMMARY

Embodiments relate to apparatuses, systems, and methods to disable a HARQ feedback in either a semi-static way or in a dynamic way, to ensure a semi-static message of disabling the HARQ feedback is reliably received, and to perform HARQ optimization by increasing HARQ process numbers without increasing a bit field size of "HARQ process number" in downlink control information (DCI).

According to some embodiments, a wireless device may include at least one antenna and at least one radio, where the at least one radio is configured to perform cellular communication. The wireless device may include one or more processors coupled to the at least one radio, where the one or more processors and the at least one radio are configured to perform voice and/or data communications.

In some embodiments, a wireless device may be configured to perform methods to receive a first set and a second set of HARQ process numbers, where the first set and the second set of HARQ process numbers correspond to a first set and a second set of HARQ processes respectively, where each HARQ process in the first set of HARQ processes is configured to enable a HARQ feedback, and where each HARQ process in the second set of HARQ processes is configured to disable or enable a HARQ feedback. The wireless device may be further configured to receive a data transmission in a HARQ process in the first set or the second set of HARQ processes. The wireless device may be further configured to determine whether to transmit a HARQ feedback based on whether the HARQ feedback is enabled or disabled.

In some embodiments, a wireless device may be configured to perform methods to receive a grant configuration or a semi-persistent scheduling (SPS), where the grant configuration or the SPS include a flag indicating whether a HARQ-based retransmission is disabled. The wireless device may be further configured to receive a data transmission. The wireless device may be further configured to receive a blind data retransmission. The wireless device may be further configured to determine whether to disable a HARQ feedback based on the flag indicating whether a HARQ-based retransmission is disabled.

In some embodiments, a wireless device may be configured to perform methods to receive a first set and a second set of HARQ process numbers, the first set and the second set of HARQ process numbers corresponding to a first set and a second set of HARQ processes respectively. The wireless device may be further configured to receive a DCI, wherein a radio network temporary identifier (RNTI) is scrambled with cyclic redundancy check (CRC) bits of the DCI. The wireless device may be further configured to determine a HARQ process number in the first set or the second set of HARQ process numbers based on the RNTI or a field in the DCI.

In some embodiments, a wireless device may be configured to perform methods to receive a first signal assigning a traffic stream to a first HARQ process. The wireless device may be further configured to transmit the traffic stream in the first HARQ process. The wireless device may be further configured to receive a second signal to suspend the traffic stream on the first HARQ process. The wireless device may be further configured to receive a third signal to reactive the traffic stream in a second HARQ process. The wireless device may be further configured to transmit the traffic stream in the second HARQ process.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

DETAILED DESCRIPTION

Figure 1:
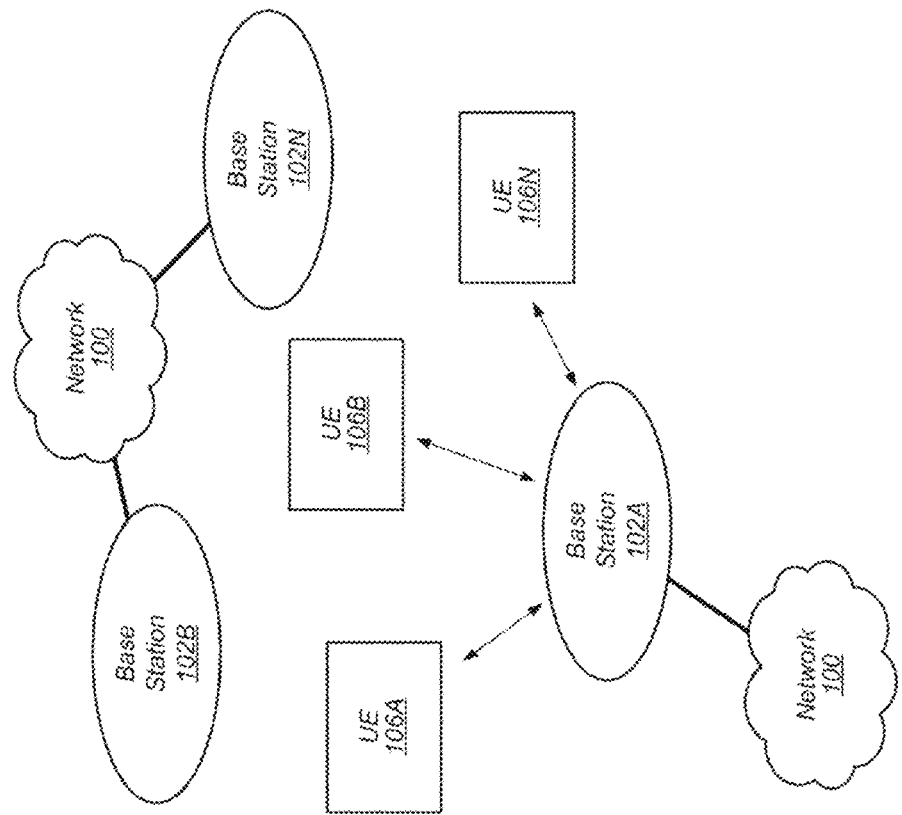
FIG. 1 illustrates an example wireless communication system according to some embodiments of the disclosure.

The following is a glossary of terms used in this disclosure:

Memory Medium-Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium-a memory medium as described above, as well as a physical transmission medium, such as a bus, network, and/or other physical transmission medium that conveys signals such as electrical, electromagnetic, or digital signals.

Programmable Hardware Element-includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System-any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")-any of various types of computer systems devices which are mobile or portable and which performs wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station-The term "Base Station" has the full breadth of its ordinary meaning, and at least includes a wireless communication station installed at a fixed location and used to communicate as part of a wireless telephone system or radio system.

Processing Element-refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel-a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band-The term "band" has the full breadth of its ordinary meaning, and at least includes a section of spectrum (e.g., radio frequency spectrum) in which channels are used or set aside for the same purpose.

Automatically-refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately-refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent-refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an eNodeB' or 'eNB'. Note that if the base station 102A is implemented in the context of 5G NR, it may alternately be referred to as 'gNodeB' or 'gNB.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B ... 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
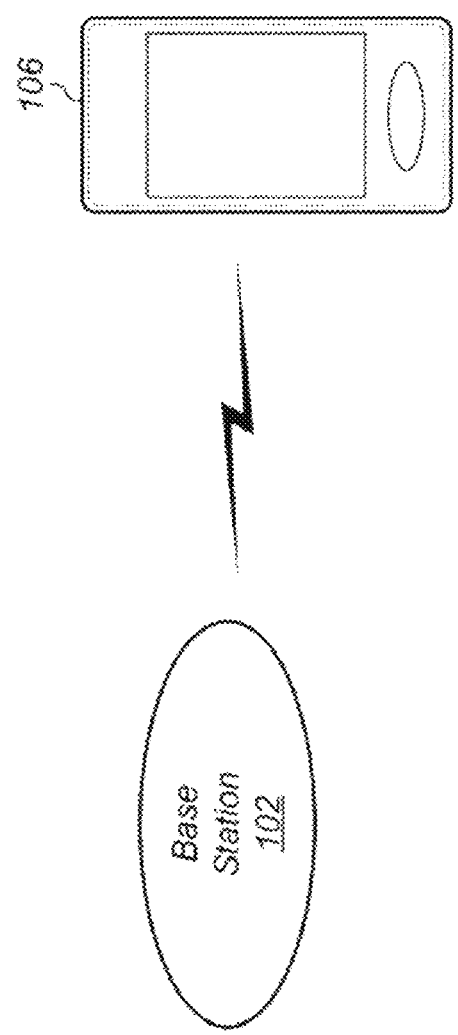
FIG. 2 illustrates a base station (BS) in communication with a user equipment (UE) device according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
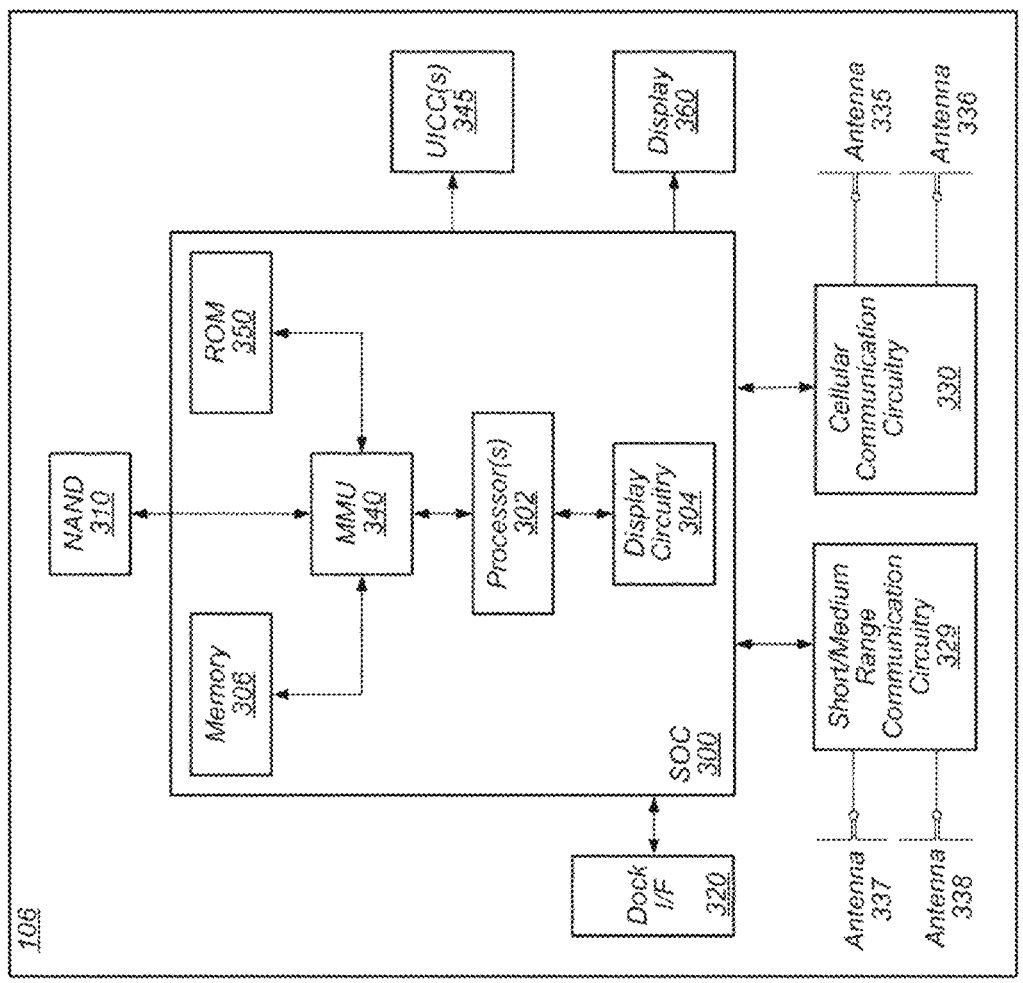
FIG. 3 illustrates an example block diagram of a UE according to some embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. In some embodiments, the communication device 106 may be configured to receive a first set and a second set of HARQ process numbers, where the first set and the second set of HARQ process numbers correspond to a first set and a second set of HARQ processes respectively, where each HARQ process in the first set of HARQ processes is configured to enable a HARQ feedback, and where each HARQ process in the second set of HARQ processes is configured to disable or enable a HARQ feedback. The wireless device may also be configured to receive a data transmission in a HARQ process in the first set or the second set of HARQ processes. Further, the wireless device may be configured to determine whether to transmit a HARQ feedback based on whether the HARQ feedback is enabled or disabled.

In some embodiments, the communication device 106 may be configured to receive a grant configuration or a semi-persistent scheduling (SPS), where the grant configuration or the SPS may include a flag indicating whether a HARQ-based retransmission is disabled. The wireless device may also be configured to receive a data transmission and to receive a blind data retransmission. Further, the wireless device may be configured to determine whether to disable a HARQ feedback based on the flag indicating whether a HARQ-based retransmission is disabled.

In some embodiments, the communication device 106 may be configured to receive a first set and a second set of HARQ process numbers, where the first set and the second set of HARQ process numbers may correspond to a first set and a second set of HARQ processes respectively. The wireless device may also be configured to receive a DCI, wherein a RNTI is scrambled with cyclic redundancy check (CRC) bits of the DCI. Further, the wireless device may be configured to determine a HARQ process number in the first set or the second set of HARQ process numbers based on the RNTI or a field in the DCI.

In some embodiments, the communication device 106 may be configured to receive a first signal assigning a traffic stream to a first HARQ process. The wireless device may also be configured to transmit the traffic stream in the first HARQ process. The wireless device may also be configured to receive a second signal to suspend the traffic stream on the first HARQ process. The wireless device may also be configured to receive a third signal to reactive the traffic stream in a second HARQ process. Further, the wireless device may be configured to transmit the traffic stream in the second HARQ process.

As described herein, the communication device 106 may include hardware and software components for implementing the above features for disabling a HARQ feedback and/or performing HARQ optimization operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
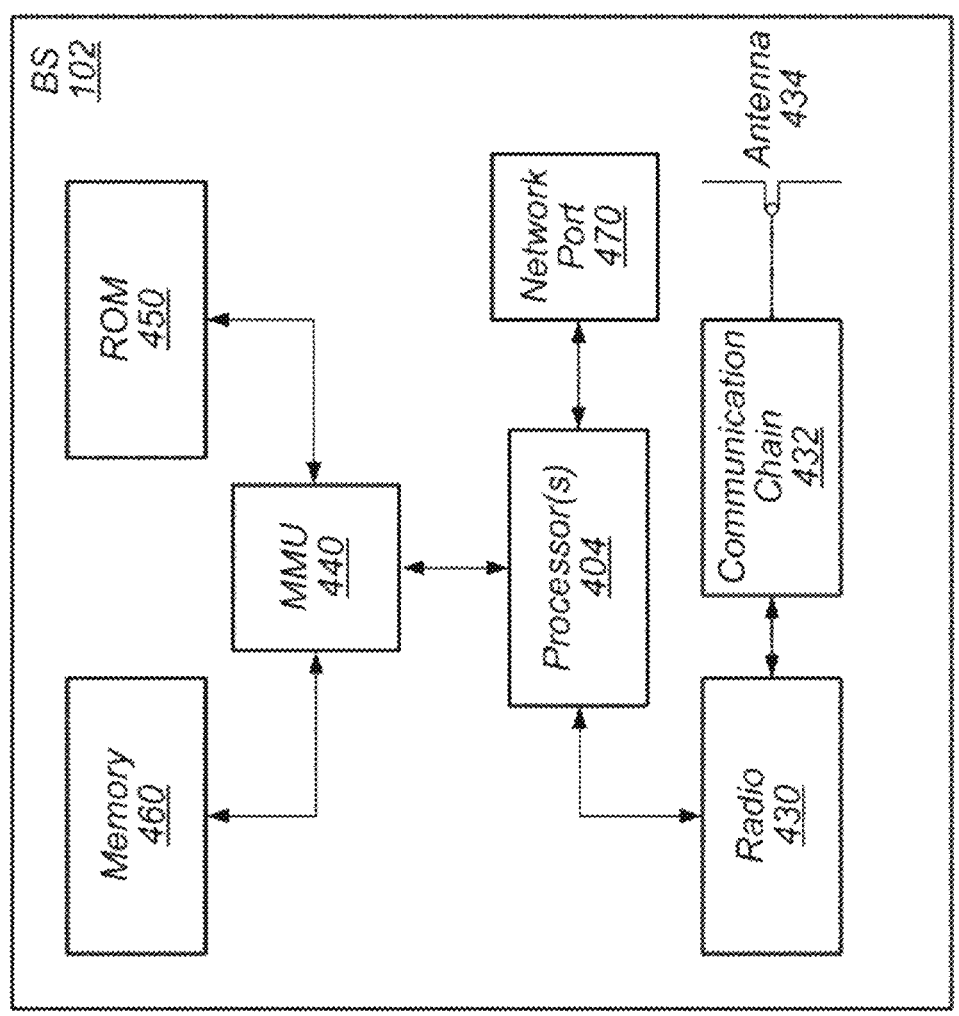
FIG. 4 illustrates an example block diagram of a BS according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.). As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
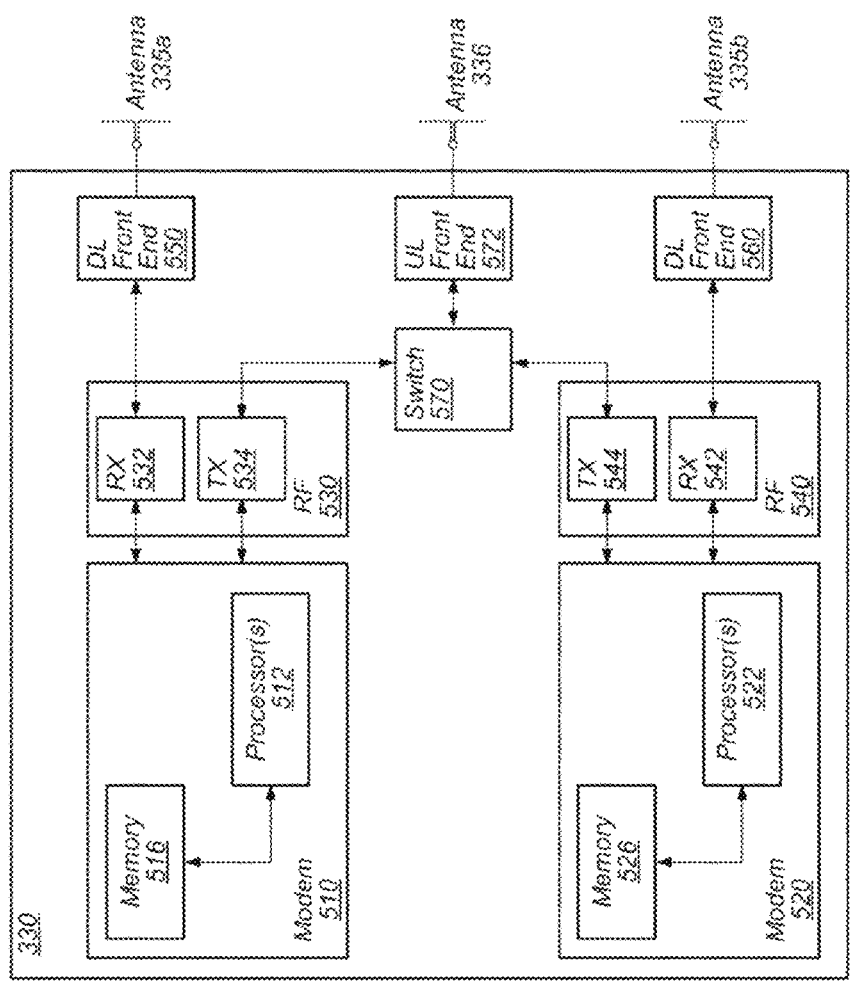
FIG. 5 illustrates an example block diagram of cellular communication circuitry according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335 a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335 b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods to receive a first set and a second set of HARQ process numbers, where the first set and the second set of HARQ process numbers correspond to a first set and a second set of HARQ processes respectively, where each HARQ process in the first set of HARQ processes is configured to enable a HARQ feedback, and where each HARQ process in the second set of HARQ processes is configured to disable or enable a HARQ feedback. The wireless device may be further configured to receive a data transmission in a HARQ process in the first set or the second set of HARQ processes. The wireless device may be further configured to determine whether to transmit a HARQ feedback based on whether the HARQ feedback is enabled or disabled.

In some embodiments, the cellular communication circuitry 330 may be configured to perform methods to receive a grant configuration or a semi-persistent scheduling (SPS), where the grant configuration or the SPS include a flag indicating whether a HARQ-based retransmission is disabled. The wireless device may be further configured to receive a data transmission. The wireless device may be further configured to receive a blind data retransmission. The wireless device may be further configured to determine whether to disable a HARQ feedback based on the flag indicating whether a HARQ-based retransmission is disabled.

In some embodiments, the cellular communication circuitry 330 may be configured to perform methods to receive a first set and a second set of HARQ process numbers, the first set and the second set of HARQ process numbers corresponding to a first set and a second set of HARQ processes respectively. The wireless device may be further configured to receive a DCI, wherein a radio network temporary identifier (RNTI) is scrambled with cyclic redundancy check (CRC) bits of the DCI. The wireless device may be further configured to determine a HARQ process number in the first set or the second set of HARQ process numbers based on the RNTI or a field in the DCI.

In some embodiments, the cellular communication circuitry 330 may be configured to perform methods to receive a first signal assigning a traffic stream to a first HARQ process. The wireless device may be further configured to transmit the traffic stream in the first HARQ process. The wireless device may be further configured to receive a second signal to suspend the traffic stream on the first HARQ process. The wireless device may be further configured to receive a third signal to reactive the traffic stream in a second HARQ process. The wireless device may be further configured to transmit the traffic stream in the second HARQ process.

As described herein, the modem 510 may include hardware and software components for implementing the above features or for disabling a HARQ feedback and/or performing HARQ optimization operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for disabling a HARQ feedback and/or performing HARQ optimization operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

The propagation delays in some areas (e.g., non-terrestrial networks) are much longer, for example, in ocean, mountain areas, and deserts where there is no base station nearby. The propagation delays may range from several milliseconds to hundreds of milliseconds. In such areas, HARQ round-trip time (RTT) can be long. For example, in downlink (DL) transmission, a base station may send data to a UE. The UE may not be able to decode the data. The UE may need to hold the HARQ buffer to wait for retransmission. However, the HARQ RTT may be very long, which may cause problems in the wireless communication.

Some mechanisms of more delay-tolerant retransmission have been studied. There are some proposals of disabling of HARQ. For example, HARQ may be disabled via DCI in new/re-interpreted field, or new Uplink Control Information (UCI) feedback for reporting DL transmission disruption and or requesting DL scheduling changes. There are also some proposals of HARQ optimization to increase throughput. For example, greater than 16 HARQ process identifications (IDs) with uplink (UL) HARQ feedback enabled via Radio Resource Control (RRC). With regards to HARQ enhancements for soft buffer management and stop-and-wait time reduction, several options were considered, such as pre-active/pre-emptive HARQ to reduce stop-and-wait time, enabling/disabling of HARQ buffer usage configurable on a per UE and per HARQ process, or HARQ buffer status report from the UE. The number of HARQ processes with additional considerations for HARQ feedback, HARQ buffer size, RLC feedback, and RLC ARQ buffer size may need further improvement.

There may be a need to develop a detailed scheme to disable HARQ feedback in either semi-static way or in dynamic way. For example, it is advantageous to ensure the semi-static message of disabling HARQ feedback is reliably received. For another example, the signaling scheme to dynamically disable HARQ feedback needs to be developed. In addition, there may be a need to develop the DCI design when HARQ feedback is disabled. Furthermore, there may be a need to develop the signaling scheme to increase the HARQ process numbers without increasing the bit field size of "HARQ process number" in DCI.

Figure 6:
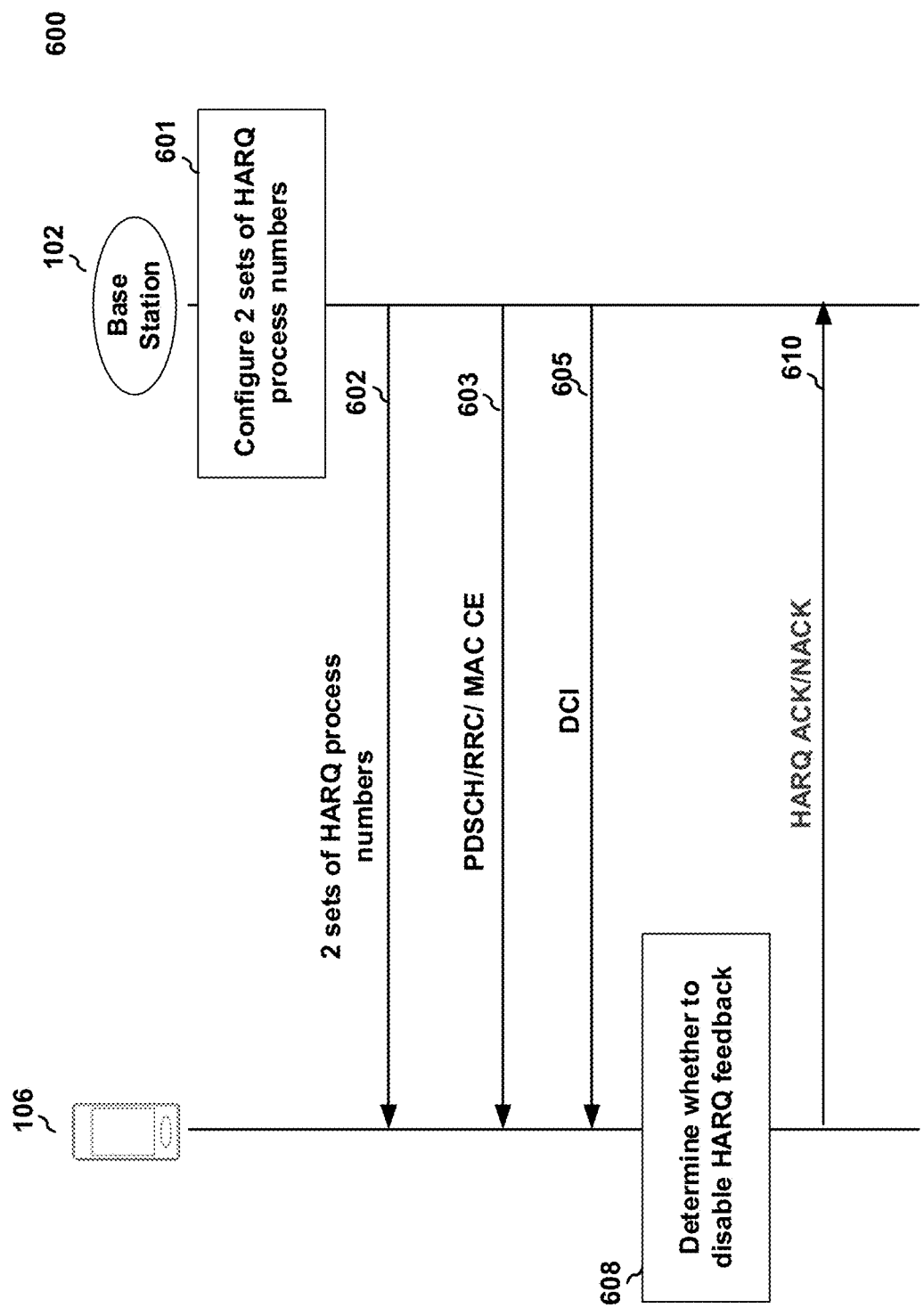
FIG. 6 is a signal flow diagram illustrating an example of multi-fold enabling/disabling HARQ feedback, according to some embodiments.

FIG. 6 is a signal flow diagram 600 illustrating an example of multi-fold enabling/disabling HARQ feedback, according to some embodiments. In order to address long HARQ RTT delay and increase throughput, a solution of multi-fold enabling/disabling HARQ feedback is disclosed herein, as illustrated in FIG. 6. In this solution, HARQ feedback may be disabled or enabled in multiple layers. Though a downlink (DL) transmission is illustrated as an example in FIG. 6, this solution may also be applied to an uplink (UL) transmission. In some embodiments, two sets of HARQ process numbers may be configured by a base station 102, as illustrated at 601. A UE 106 may receive a first set and a second set of HARQ process numbers 602. The first set and the second set of HARQ process numbers 602 may correspond to a first set and a second set of HARQ processes respectively. Each HARQ process in the first set of HARQ processes is configured to enable a HARQ feedback, and each HARQ process in the second set of HARQ processes is configured to disable or enable a HARQ feedback. In each HARQ process in the first set of HARQ processes, the HARQ feedback is always on. In each HARQ process in the second set of HARQ processes, the HARQ feedback is flexible, may be on or off.

In some embodiments, the number of HARQ processes in the first set (Set 1) is X, while the number of HARQ processes in the second set (Set 2) is N-X, where N is either 16 or 32 or other numbers, probably based on UE capability. The number of HARQ processes in the first set may depend on UE capability or quality of service (QoS). For a UE with more capability, X is larger; for a UE with less capability, X is smaller. For data with higher reliability requirements, X is larger; for data with less reliability requirements, X is smaller.

In some embodiments, an RRC configuration message or a Medium Access Control (MAC) Control Element (MAC CE) message 603 may semi-statically enable or disable a HARQ feedback for the HARQ processes in the second set of HARQ processes. As illustrated in FIG. 6, the UE 106 may receive the RRC message or the MAC CE message 603 through a physical downlink shared channel (PDSCH), where each HARQ process in the second set of HARQ processes may be configured to disable or enable the HARQ feedback by the RRC message or the MAC CE message 606.

For DL transmission, the RRC message or the MAC CE message 603 may be sent from the base station 102. The RRC message or the MAC CE message 603 needs to be reliably sent to the UE 106 such that the UE 106 knows which HARQ process has a feedback disabled. In some embodiments, the message of RRC/MAC CE 603 to semi-statically enable or disable the HARQ feedback is sent using a HARQ process whose number is in the first set of HARQ process numbers (i.e., HARQ feedback is always on for the transmission).

In some embodiments, the message of RRC/MAC CE 603 to semi-statically enable or disable the HARQ feedback may be sent using a HARQ process whose number is in the second set of HARQ process numbers. Higher layer confirmation of this RRC/MAC CE message may be needed. In some embodiments, the RRC/MAC CE message 603 may indicate a timing of the HARQ feedback enabling or disabling. For example, the RRC/MAC CE message 603 may indicate a starting time, an ending time, a duration of the HARQ feedback being enabled or disabled. If the HARQ feedback/retransmission is switched from being enabled to being disabled, then a regular HARQ feedback/retransmission still applies to the RRC/MAC CE message. If the HARQ feedback/retransmission is switched from being disabled to enabled, a timer may be configured. Then, the HARQ feedback/retransmission may apply after a configured time period by the timer.

In some embodiments, for a HARQ process in the second set of HARQ processes with semi-statically enabled HARQ feedback, DCI 605 may be configured to disable a HARQ feedback for a DL transmission. As illustrated in FIG. 6, the UE 106 may receive the DCI 605 through a physical downlink control channel (PDCCH). This applies for downlink transmissions and uplink transmissions. For uplink transmission, the base station 102 may disable the HARQ feedback by always toggling a new data indicator (NDI) in DCI 605.

DCI signaling 605 may be used to dynamically disable the HARQ feedback. In some embodiments, field reinterpretation may be used to indicate the HARQ feedback is disabled. For example, in DCI format 1_0, the field "PDSCH-to-HARQ feedback timing indicator" may have a code point to indicate the HARQ feedback is disabled when a higher layer flag is set to True. If a higher layer flag (i.e., "HARQ-disabling") is set to "True", then the 3-bit field (e.g., from "000" to "110") may directly indicate the slot offset between PDSCH and HARQ feedback is from 1 to 7, where the all "1" field may indicate HARQ feedback is disabled. If a higher layer flag (i.e., "HARQ-disabling") is set to "False", then the 3-bit field may directly indicate the slot offset between PDSCH and HARQ feedback is from 1 to 8. In DCI format 1_1, the higher layer parameter "dl-DataToUL-ACK" may have an entry to indicate the HARQ feedback is disabled. This feature may be enabled if a higher layer flag (i.e., "HARQ-disabling") is set to "True". At 608, the UE may determine whether to disable a HARQ feedback. The UE may transmit the HARQ feedback 610 if the HARQ feedback is enabled.

Figure 7:
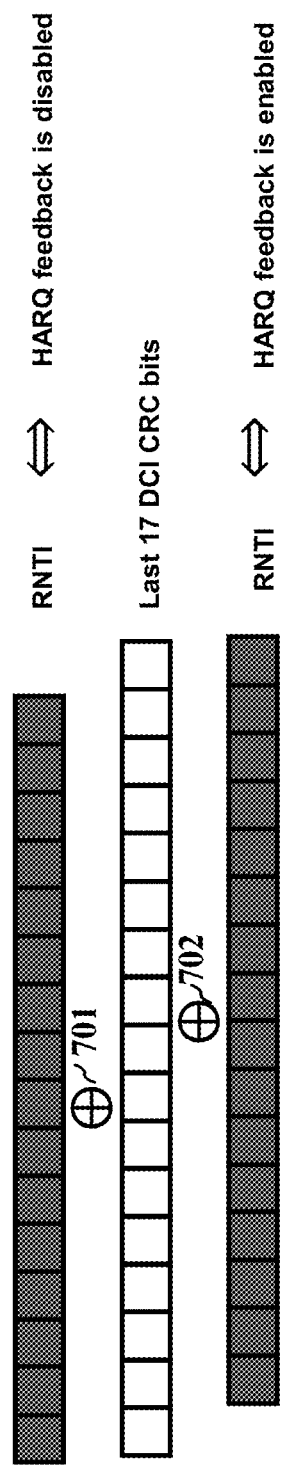
FIG. 7 is a diagram illustrating a radio network temporary identifier (RNTI) indicating whether a HARQ feedback is enabled or disabled.

FIG. 7 is a diagram 700 illustrating a radio network temporary identifier (RNTI) indicating whether a HARQ feedback is enabled or disabled. RNTI based indication may be used to indicate the HARQ feedback is enabled or disabled. In some embodiments, two different RNTIs may be used to indicate whether HARQ feedback is enabled or disabled. If the first RNTI is used, the HARQ feedback is enabled; if the second RNTI is used, the HARQ feedback is disabled.

In some embodiments, RNTI scrambled on different positions of DCI cyclic redundancy check (CRC) may be used to indicate whether a HARQ feedback is enabled or disabled. Only last 17 DCI CRC bits are not distributed, which can be used for scrambling. If last 16 DCI CRC bits are scrambled by RNTI, as illustrated at 702, then HARQ feedback is enabled. If second last 16 DCI CRC bits are scrambled by RNTI, as illustrated at 701, then HARQ feedback is disabled.

Figure 8:
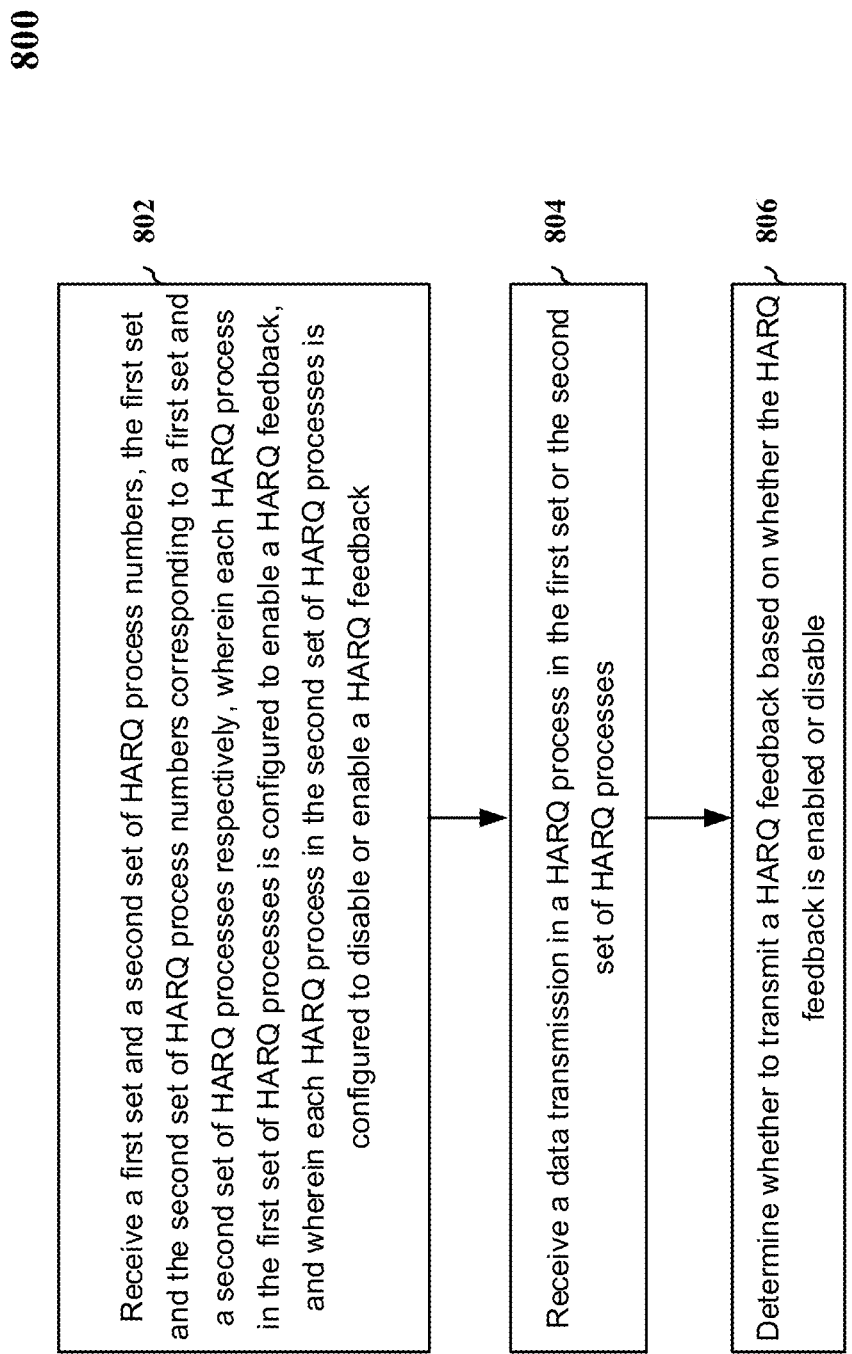
FIG. 8 illustrates a block diagram of an example of a method of multi-fold enabling/disabling HARQ feedback, according to some embodiments.

FIG. 8 illustrates a block diagram of an example of a method of multi-fold enabling/disabling HARQ feedback, according to some embodiments. In this method, HARQ feedback may be disabled or enabled in multiple layers, thereby increasing throughput. Though downlink (DL) transmission is illustrated as an example in FIG. 8, this method may also be applied to uplink (UL) transmission. The method shown in FIG. 8 may be used in conjunction with any of the systems, techniques, or devices shown in the above Figures, among other techniques and devices. In various embodiments, some of the method elements shown may be performed concurrently, in a different order than shown, or may be omitted. Additional method elements may also be performed as desired. As shown, this method may operate as follows.

At 802, a wireless device, such as UE 106, may receive a first set and a second set of HARQ process numbers. For example, referring back to FIG. 6, two sets of HARQ process numbers may be configured by a base station 102, as illustrated at 601. A UE 106 may receive a first set and a second set of HARQ process numbers 602. The first set and the second set of HARQ process numbers 602 may correspond to a first set and a second set of HARQ processes respectively. Each HARQ process in the first set of HARQ processes is configured to enable a HARQ feedback, and each HARQ process in the second set of HARQ processes is configured to disable or enable a HARQ feedback. In each HARQ process in the first set of HARQ processes, the HARQ feedback is always on. In each HARQ process in the second set of HARQ processes, the HARQ feedback is flexible, may be on or off.

At 804, the UE may receive a data transmission in a HARQ process in the first set or the second set of HARQ processes. In some embodiments, the number of HARQ processes in the first set (Set 1) is X, while the number of HARQ processes in the second set (Set 2) is N-X, where N is either 16 or 32 or other integer numbers, probably based on UE capability. The number of HARQ processes in the first set may depend on UE capability or quality of service (QoS). For a UE with more capability, X is larger; for a UE with less capability, X is smaller. For data with higher reliability requirements, X is larger; for data with less reliability requirements, X is smaller.

In some embodiments, an RRC configuration message or an MAC CE message may semi-statically enable or disable a HARQ feedback for the HARQ processes in the second set of HARQ processes. For example, referring back to FIG. 6, the UE 106 may receive the RRC message or the MAC CE message 603 through a PDSCH, where each HARQ process in the second set of HARQ processes may be configured to disable or enable the HARQ feedback by the RRC message or the MAC CE message 506.

In some embodiments, DCI signaling may be used to dynamically disable the HARQ feedback. For example, field reinterpretation may be used to indicate the HARQ feedback is disabled. In some embodiments, two different RNTIs may be used to indicate whether HARQ feedback is enabled or disabled. If the first RNTI is used, the HARQ feedback is enabled; if the second RNTI is used, the HARQ feedback is disabled. In some embodiments, RNTI scrambled on different positions of DCI CRC may be used to indicate whether a HARQ feedback is enabled or disabled.

At 806, the wireless device may determine whether to transmit a HARQ feedback based on whether the HARQ feedback is enabled or disabled.

In some embodiments, a wireless device (e.g., such as UE 106) may perform a method of multi-fold enabling/disabling HARQ feedback. In some embodiments, the wireless device, e.g., such as UE 106, may include at least an antenna, a radio coupled to (and/or in communication with) the antenna, and a processing element coupled to (and/or in communication with) the radio. In some embodiments, the method may include program instructions executable by the processing element (and/or processing circuitry) of the wireless device. In some embodiments, the method may include receiving a first set and a second set of HARQ process numbers, the first set and the second set of HARQ process numbers correspond to a first set and a second set of HARQ processes respectively, where each HARQ process in the first set of HARQ processes is configured to enable a HARQ feedback, and where each HARQ process in the second set of HARQ processes is configured to disable or enable a HARQ feedback. The method may further include receiving a data transmission in a HARQ process in the first set or the second set of HARQ processes. The method may further include determining whether to transmit a HARQ feedback based on whether the HARQ feedback is enabled or disabled.

Figure 9:
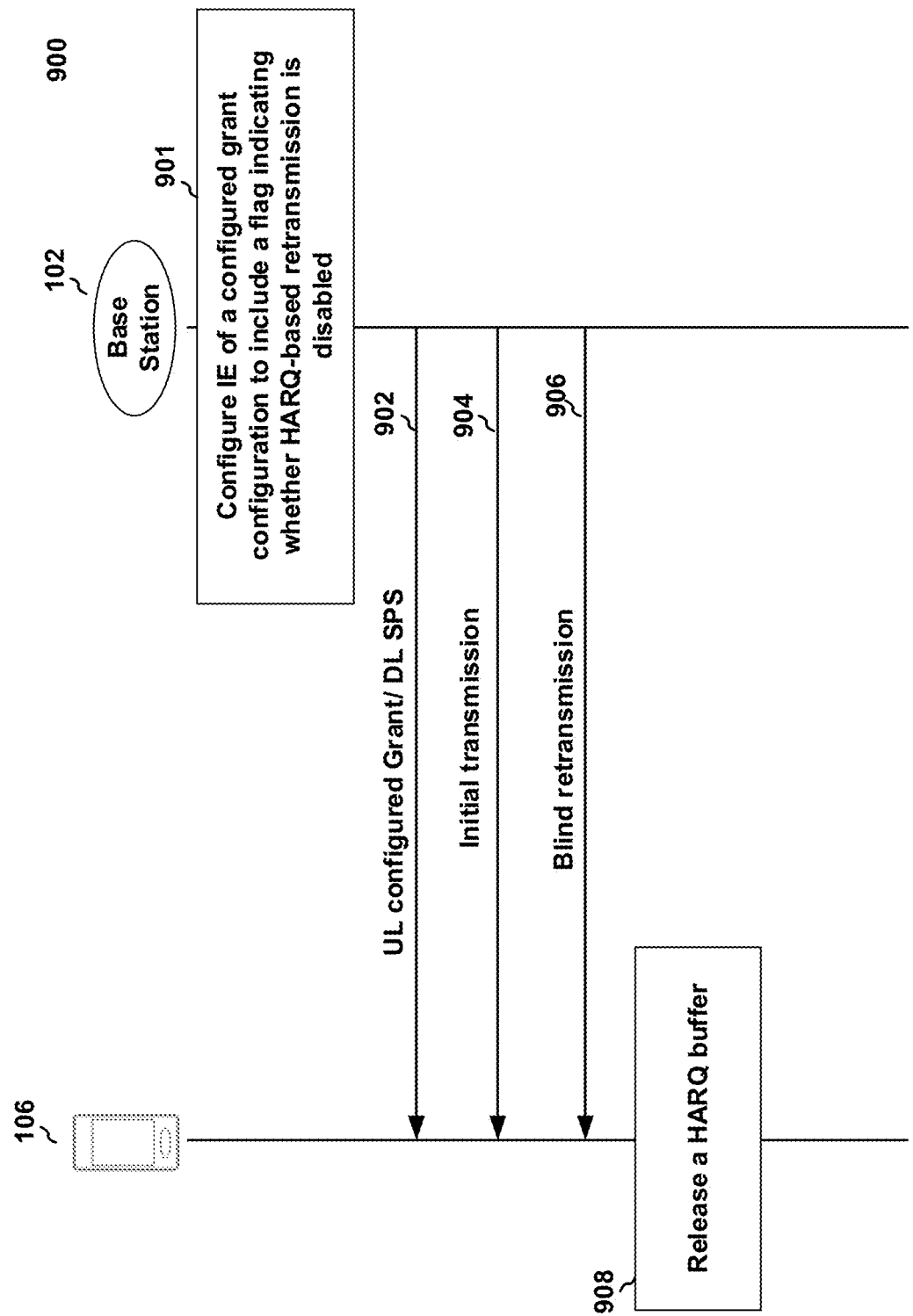
FIG. 9 is a signal flow diagram illustrating an example of a solution of indication of HARQ enabling/disabling, according to some embodiments.

FIG. 9 is a signal flow diagram 900 illustrating an example of a solution of indication of HARQ enabling/disabling, according to some embodiments. In some embodiments, whether a HARQ-based retransmission is enabled or disabled may be indicated in an uplink configured grant configuration and/or a downlink semi-persistent scheduling (SPS). For DL transmission from a base station 102, a UE 106 may buffer soft data in a HARQ buffer if the UE 106 does not decode the data. The UE 106 may wait for the base station 102 to retransmit so that soft combining may be used. In this solution, the UE 106 may release the HARQ buffer after an initial transmission and a blind retransmission, without waiting a long time of receiving an uplink grant DCI with a NDI toggling of the same HARQ process. In this way, since the UE 106 is allowed to release the HARQ buffer, the UE 106 may start buffering new data when more new data is coming during the period. The HARQ-based retransmission enabling or disabling includes both a HARQ buffer clearness and a HARQ feedback transmission. If the HARQ-based retransmission is disabled, there is no HARQ feedback, and no HARQ buffer maintenance. For a DL transmission, if HARQ-based retransmission is disabled, then the UE 106 does not send HARQ-ACK bits and the base station 102 does not perform retransmissions based on the UE's HARQ-NACK. Also, both the UE 106 and the base station 102 can clear up their HARQ buffers as no retransmissions are happening.

In some embodiments, the information element (IE) of a configured grant configuration ("ConfiguredGrantConfig") may include a flag indicating whether HARQ-based retransmission is disabled. The scheme may apply to both SPS, type 1 configured grant and type 2 configured grant. For example, ConfiguredGrantConfig={
   nrofHARQ-Processes INTEGER(1 . . . 16)
   HARQ-based-retransmission BOOLEAN . . . }

The flag may be per HARQ process, i.e., each allocated HARQ process in a configured grant or SPS may be associated with a single flag indicating whether HARQ-based retransmission is disabled. For example, ConfiguredGrantConfig={
   nrofHARQ-Processes INTEGER(1 . . . 16)
   HARQ-based-retransmission BIT STRING (SIZE (16)) . . . }

As illustrated in FIG. 9, for example, the base station 102 may configure IE of a configured grant configuration to include the flag indicating whether HARQ-based retransmission is disabled at 901. The base station 102 may configure a DL SPS to include a flag indicating whether HARQ-based retransmission is disabled. The base station 102 may send the configured grant configuration and/or SPS 902 to the UE 106. The base station 102 may send a data transmission 904 to the UE 106. The base station 102 may send a blind transmission 906 to the UE 106. At 908, the UE 106 may release the HARQ buffer after the initial transmission 904 and the blind retransmission 906, based on the SPS 902.

Figure 10:
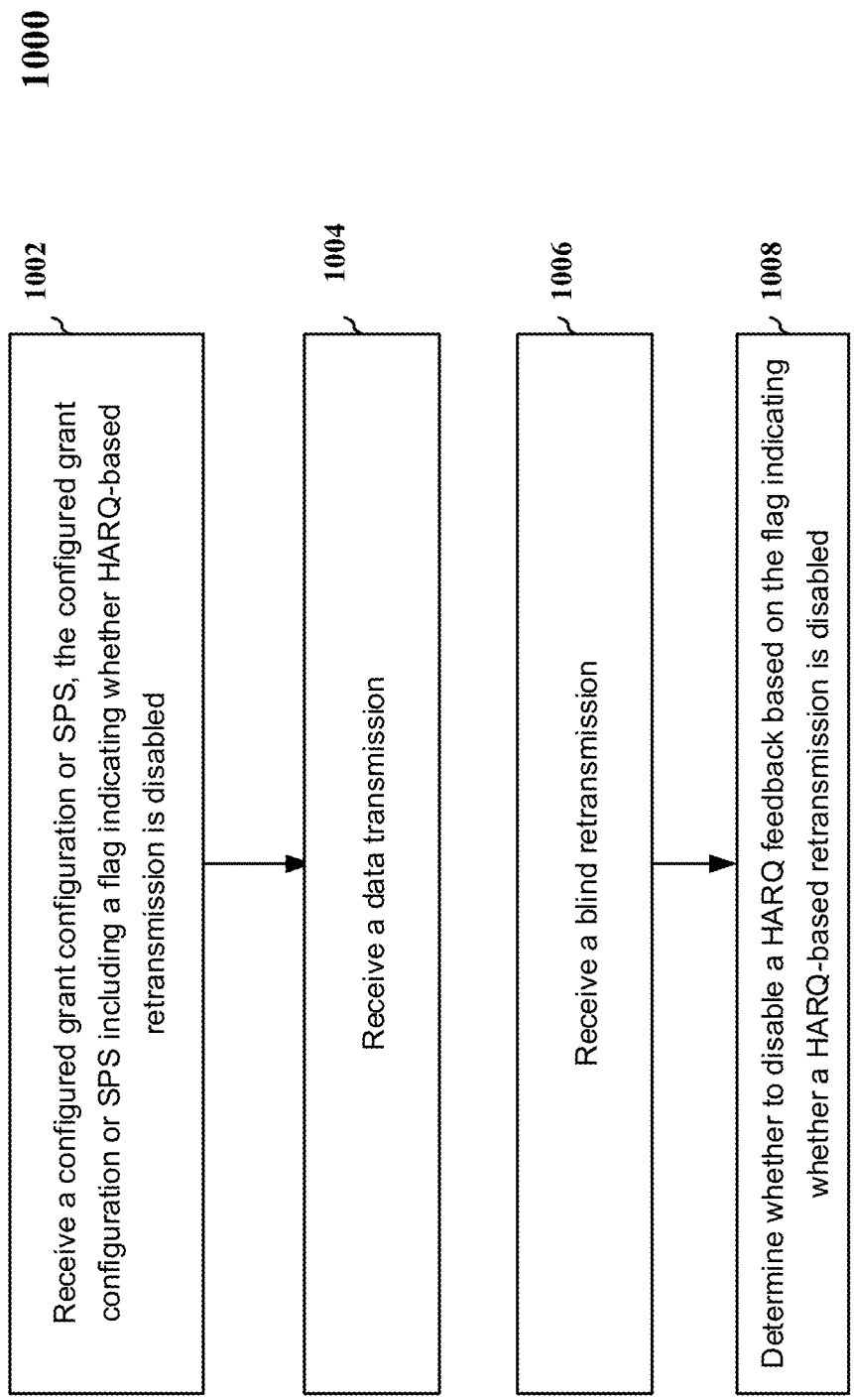
FIG. 10 illustrates a block diagram of an example of a method of indication of a HARQ-based retransmission, according to some embodiments.

FIG. 10 illustrates a block diagram 1000 of an example of a method of indication of a HARQ-based retransmission, according to some embodiments. In this method, whether the HARQ-based retransmission is enabled or disabled may be indicated in an uplink configured grant configuration and/or a downlink SPS. The method shown in FIG. 10 may be used in conjunction with any of the systems, techniques, or devices shown in the above Figures, among other techniques and devices. In various embodiments, some of the method elements shown may be performed concurrently, in a different order than shown, or may be omitted. Additional method elements may also be performed as desired. As shown, this method may operate as follows.

At 1002, a wireless device, such as UE 106, may receive a configured grant configuration and/or SPS from a base station. The base station 102 may send a data transmission 904 to the UE 106. The base station 102 may send a blind transmission 906 to the UE 106. At 908, the UE 106 may release the HARQ buffer after the initial transmission 904 and the blind retransmission 906, based on the configured grant configuration/SPS 902.

At 1004, the wireless device (e.g., UE 106) may receive a data transmission from the base station.

At 1006, the wireless device (e.g., UE 106) may receive a blind data retransmission from the base station.

At 1008, the wireless device (e.g., UE 106) may determine whether to disable a HARQ feedback based on the flag indicating whether a HARQ-based retransmission is disabled.

In some embodiments, the wireless device may determine to disable the HARQ feedback based on the flag indicating the HARQ-based retransmission is disabled, and release a HARQ buffer based on the determining to disable the HARQ feedback.

In order to address the problems of long HARQ RTT delay, HARQ optimization may be used to increase throughput. For example, greater than 16 HARQ process IDs may be used with UL HARQ feedback enabled via Radio Resource Control (RRC). If UE capability is greater than 16 HARQ process IDs, greater than 16 HARQ process IDs may be used. The 4-bit HARQ process ID field in DCI may be kept, with HARQ process IDs based on one of a slot number, a virtual process ID based HARQ re-transmission timing restrictions, a reuse HARQ process ID within round-trip delay (RTD) time window, and a re-interpretation of existing DCI fields with assistance information from higher layers.

Figure 11:
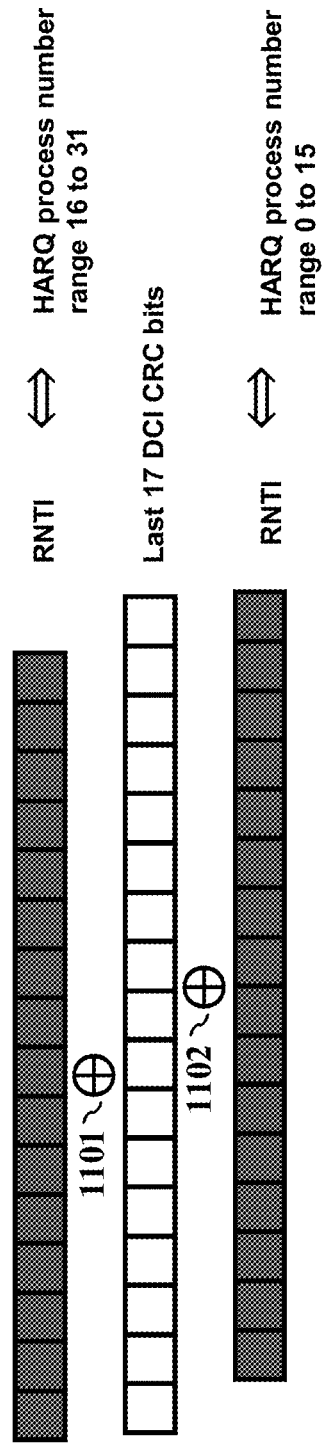
FIG. 11 is a diagram illustrating an example of HARQ optimization based on RNTI, according to some embodiments.

FIG. 11 is a diagram 1100 illustrating an example of HARQ optimization based on RNTI. In order to address the issues due to long HARQ RTD, the number of HARQ processes may be increased from 16 to 32, while a 4-bit "HARQ process #" field may be kept in DCI.

An RNTI based HARQ process number indication may be used. In some embodiments, two different RNTIs, a first RNTI and a second RNTI, may be used to indicate different ranges of HARQ process numbers. For example, if the first RNTI is used, a first set of HARQ process numbers (e.g., HARQ process IDs from 0 to 15) may be indicated by the "HARQ process #" field in DCI; if the second RNTI is used, the second set of HARQ process numbers (e.g., HARQ process IDs from 16 to 31) may be indicated by "HARQ process #" field in DCI. The second RNTI may be used based on UE capability In some embodiments, RNTI scrambled on different positions of DCI CRC may be used to indicate different ranges of HARQ process numbers. For example, if last 16 DCI CRC bits are scrambled by RNTI, then the HARQ process number is from 0 to 15, as illustrated at 1102. If second last 16 DCI CRC bits are scrambled by RNTI, then the HARQ process number is from 16 to 31, as illustrated at 1101.

Either of the above embodiments can be applied to either dynamic grants, SPS or configured grants.

A HARQ process number may be indicated with DCI fields re-interpretation. In some embodiments, one bit in a 2-bit redundancy version (RV) field in DCI may be used to indicate HARQ process number range. If up to 32 HARQ process numbers are enabled (via high layer signaling), then the least significant bit (LSB) (or most significant bit (MSB)) of RV may be used together with the 4-bit "HARQ process number" field to indicate the HARQ process number.

The remaining 1-bit "RV" field in DCI may be used to indicate the RV of 0 or 3. No RV of 1 or 2 may be supported. It may be reasonable as the required soft buffer size increases (or doubled) with the number of HARQ processes. To maintain the overall soft buffer size, the buffer size per HARQ process may be reduced.

In some embodiments, a virtual resource block-to-physical resource block mapping (VRB-to-PRB mapping) field in DCI may be used to indicate the HARQ process number range. For example, if up to 32 HARQ process numbers are enabled (via high layer signaling), then the "VRB-to-PRB mapping" field may be used together with the 4-bit "HARQ process number" field to indicate the HARQ process number. The VRB-to-PRB mapping is always non-interleaved.

Figure 12:
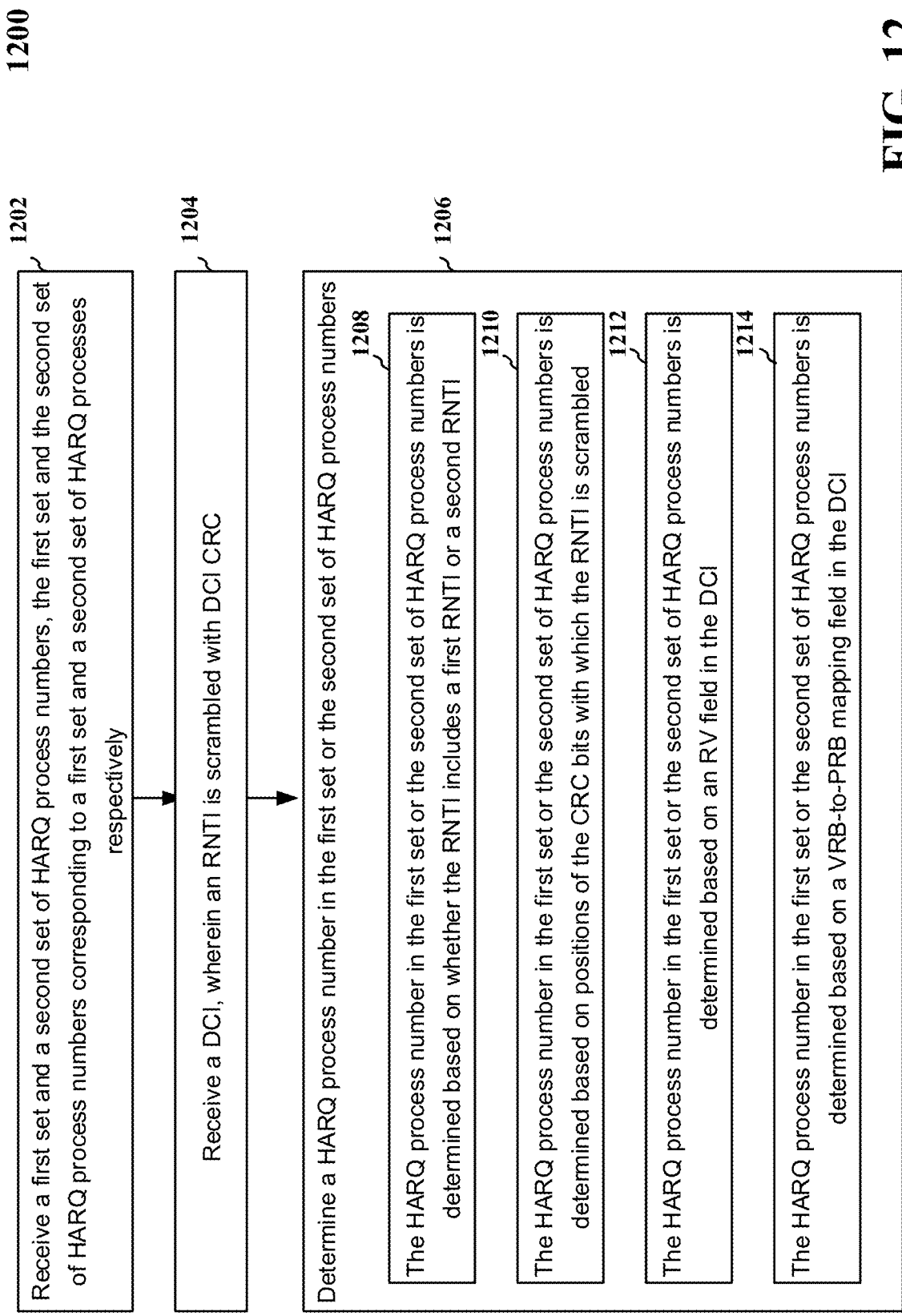
FIG. 12 illustrates a block diagram of an example of a method of HARQ optimization, according to some embodiments.

FIG. 12 illustrates a block diagram 1200 of an example of a method of HARQ optimization, according to some embodiments. In this method, a HARQ process number is determined based on an RNTI or a field re-interpretation in the DCI. The method shown in FIG. 12 may be used in conjunction with any of the systems, techniques, or devices shown in the above Figures, among other techniques and devices. In various embodiments, some of the method elements shown may be performed concurrently, in a different order than shown, or may be omitted. Additional method elements may also be performed as desired. As shown, this method may operate as follows.

At 1202, a wireless device, such as a UE 106, may receive a first set and a second set of HARQ process numbers, where the first set and the second set of HARQ process numbers correspond to a first set and a second set of HARQ processes respectively. In some embodiments, a HARQ process in the first set of HARQ processes has an identification number from 0 to 15, and wherein a HARQ process in the second set of HARQ processes has an identification number from 16 to 31.

At 1204, the wireless device (e.g., UE 106) may receive a DCI through PDCCH, wherein an RNTI is scrambled with CRC bits of the DCI.

At 1206, the wireless device (e.g., UE 106) may determine a HARQ process number in the first set or the second set of HARQ process numbers based on the RNTI or a field in the DCI.

At 1208, in some embodiments, two different RNTIs to indicate different ranges of HARQ process numbers. The first set or the second set of HARQ process numbers may be indicated by a "HARQ process number" field in the DCI based on whether the RNTI includes a first RNTI or a second RNTI. The HARQ process number in the first set or the second set of HARQ process numbers may be determined based on whether the RNTI includes a first RNTI or a second RNTI.

At 1210, in some embodiments, the HARQ process number in the first set or the second set of HARQ process numbers is determined based on positions of the CRC bits with which the RNTI is scrambled.

At 1212, in some embodiments, the HARQ process number in the first set or the second set of HARQ process numbers is determined based on a redundancy version field in the DCI.

At 1214, in some embodiments, the HARQ process number in the first set or the second set of HARQ process numbers is determined based on a VRB-to-PRB mapping field in the DCI.

Figure 13:
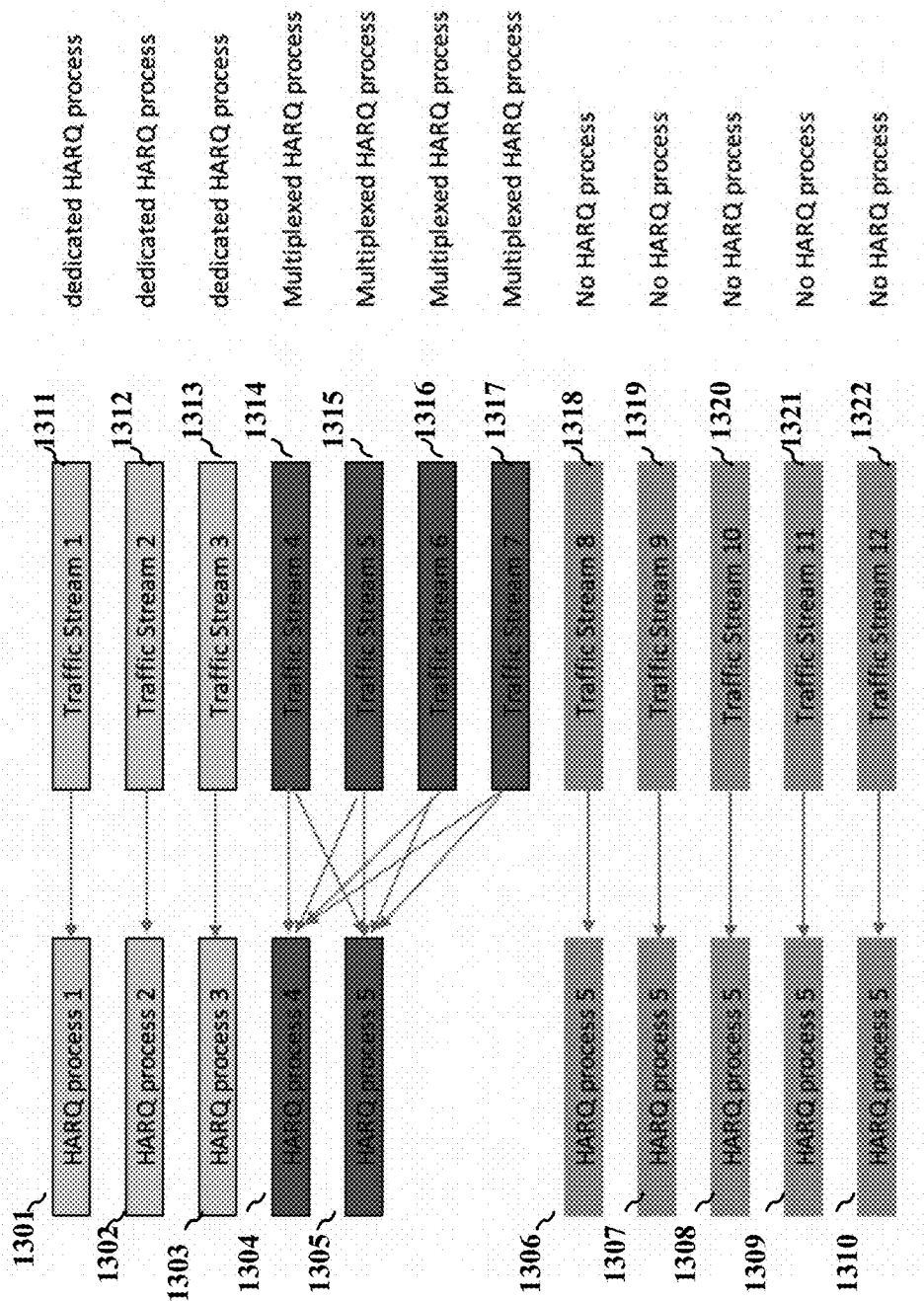
FIG. 13 illustrate an example of traffic stream HARQ assignment, according to some embodiments.

FIG. 13 illustrates an example of traffic stream HARQ assignment, according to some embodiments. In some embodiments, UE traffic stream may have a configuration to allow for 3 classes of HARQ processes: dedicated HARQ processes, multiplexed/shared HARQ processes and no-HARQ processes. For example, a base station (e.g., 102) may configure a UE (e.g., 106) with dedicated HARQ processes, multiplexed/shared HARQ processes and no HARQ processes. Dedicated processes may have unique HARQ ID and buffer. Shared/Multiplexed processes may share HARQ ID, and may have overflow buffer. No HARQ processes may have no HARQ ID and no buffer (best effort).

Referring to FIG. 13, as an example, the UE (e.g., 106) may have a total of 12 traffic streams: traffic steams 1-12 (1311-1322). The UE may be configured to have a total of 10 HARQ processes (1301-1310) with 3 dedicated HARQ processes (1301-1303), 2 Shared/Multiplexed HARQ processes (1304-1305) and 5 No HARQ processes (1306-1310). As illustrated in FIG. 13, traffic streams 1311-1313 have dedicated HARQ processes 1301-1303; traffic streams 1314-1317 have share HARQ processes 1304-1305; traffic streams 1318-1322 have no HARQ processes 1306-1310. The base station may receive information from the UE indicating type of HARQ processes requested.

Figure 14A:
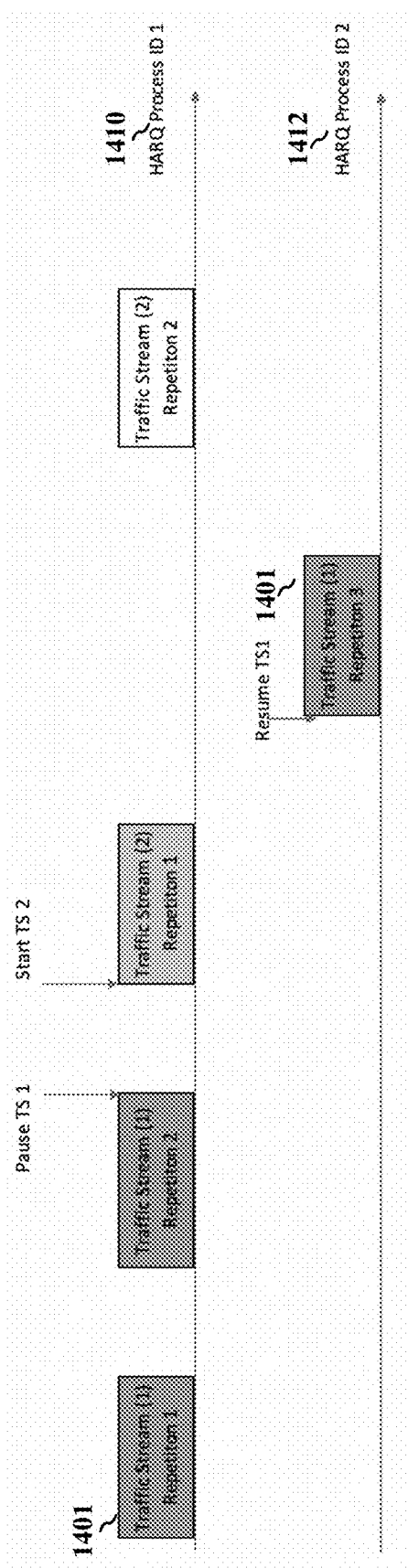
FIGS. 14A-14B illustrate an example of dynamically enabling/disabling of HARQ process, according to some embodiments.
Figure 14B:
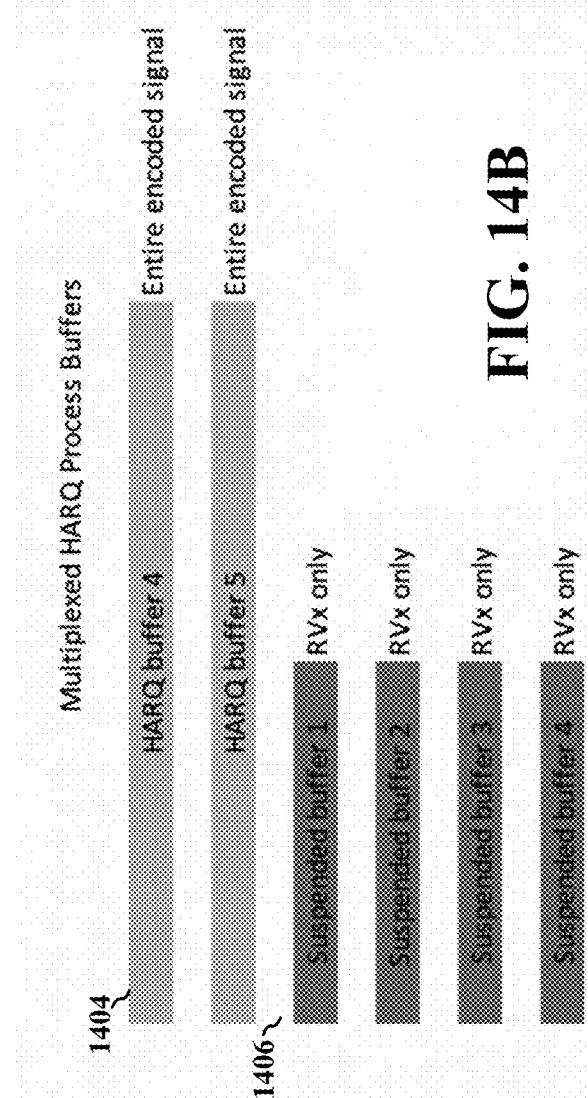
Figure 15:
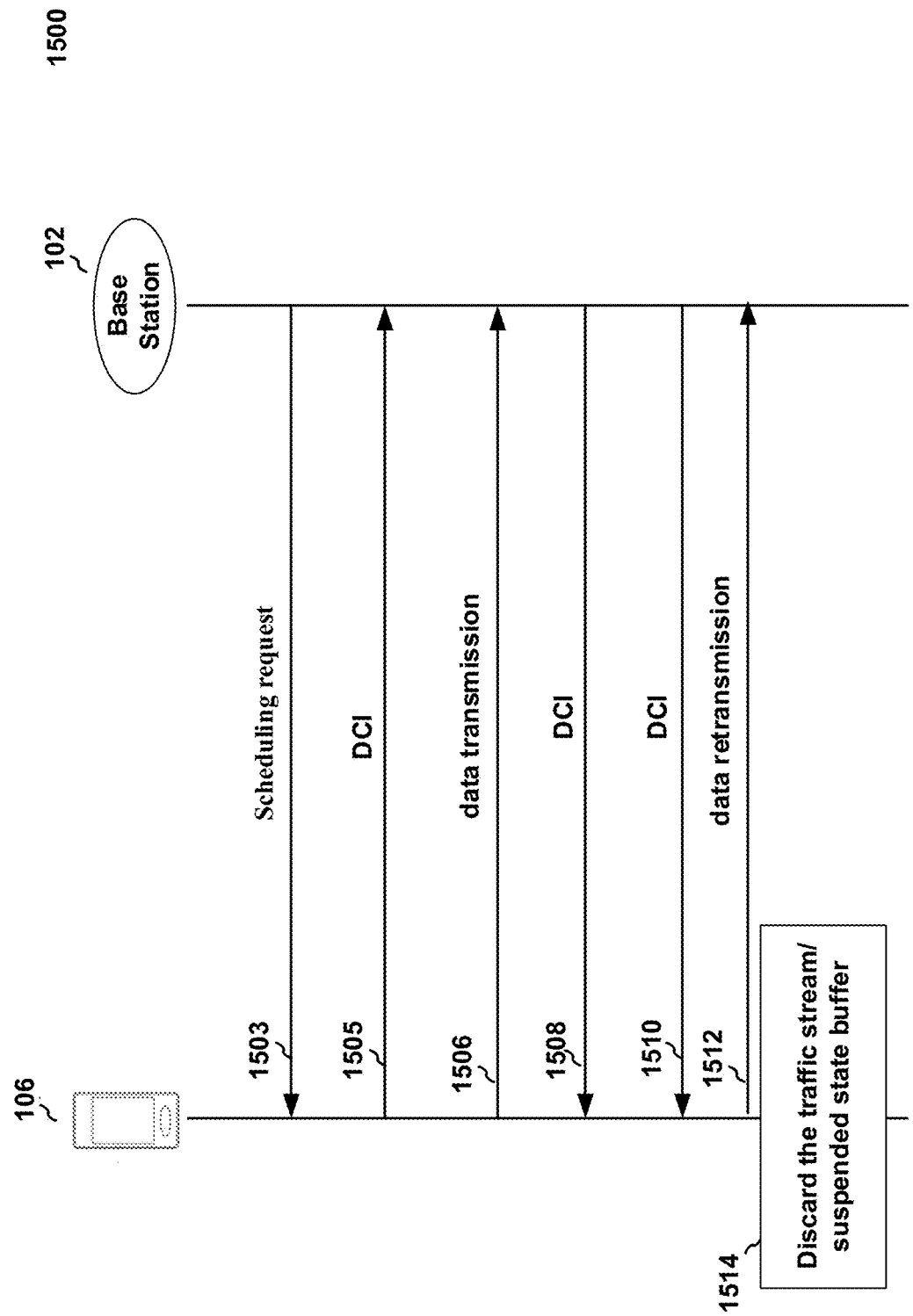
FIG. 15 is a signal flow diagram illustrating the example of dynamically enabling/disabling of HARQ process, according to some embodiments.

FIGS. 14A-14B illustrate an example of dynamically enabling/disabling of HARQ process, according to some embodiments. FIG. 15 is a signal flow diagram 1500 illustrating the example of dynamically enabling/disabling of HARQ process, according to some embodiments. Referring to FIGS. 14A-15, dynamically switching HARQ process ID may be used to enable multiplexing multiple traffic streams on a limited number of HARQ processes. In some embodiments, a base station (e.g., 102) may assign a UE (e.g., 106) traffic stream a shared HARQ process and dynamically disable/enable/transfer the traffic stream at a future time. This may allow the base station to multiplex multiple traffic streams on a limited number of HARQ processes.

The UE may receive a DCI 1505 assigning a traffic stream 1401 to a shared HARQ process 1410.

In scheduling request 1503, the UE may indicate traffic is "HARQ-pausable", which means traffic latency requirements may allow its retransmissions to be sent at large intervals. The amount of time may be signaled by the UE. For example, logical channel may be used to indicate the traffic type.

The UE may transmit data transmission 1506 using parameters of the HARQ process 1410.

The UE may receive a signal (e.g. a DCI, e.g., a GC-DCI) 1508 to move the traffic stream 1401 on the HARQ process 1410 to a "suspended state". A "suspended state" index may be used to enable the base station/UE to identify the specific HARQ process. The "suspended state buffer" (e.g., 1406, as illustrated in FIG. 14B) may be a smaller buffer than the HARQ buffer (e.g., 1404, as illustrated in FIG. 14B). The "suspended state buffer" may contain (a) the bits for a single redundancy version (b) the uncoded bits.

At a later time, the base station may assign the traffic stream with a new HARQ process 1412.

The UE may receive a signal (e.g. a DCI) 1510 to move the traffic stream 1401 from the "suspended state" to an "active state". For example, the HARQ process ID in the new active state may be the same as the original HARQ process ID. For another example, the HARQ process ID in the new active state may be different from the original HARQ process ID. The UE may use the suspended state buffer index as the "new" HARQ index.

The UE may resume HARQ retransmissions 1512 for the traffic stream 1401.

The UE may discard the traffic stream/suspended state buffer at 1514. For example, the UE may discard the traffic stream/suspended state buffer autonomously after a configured, signaled or pre-determined time limit. For another example, the UE may receive signaling from the base station to discard specific "suspended states", e.g., on successful decoding, after a time limit.

Figure 16:
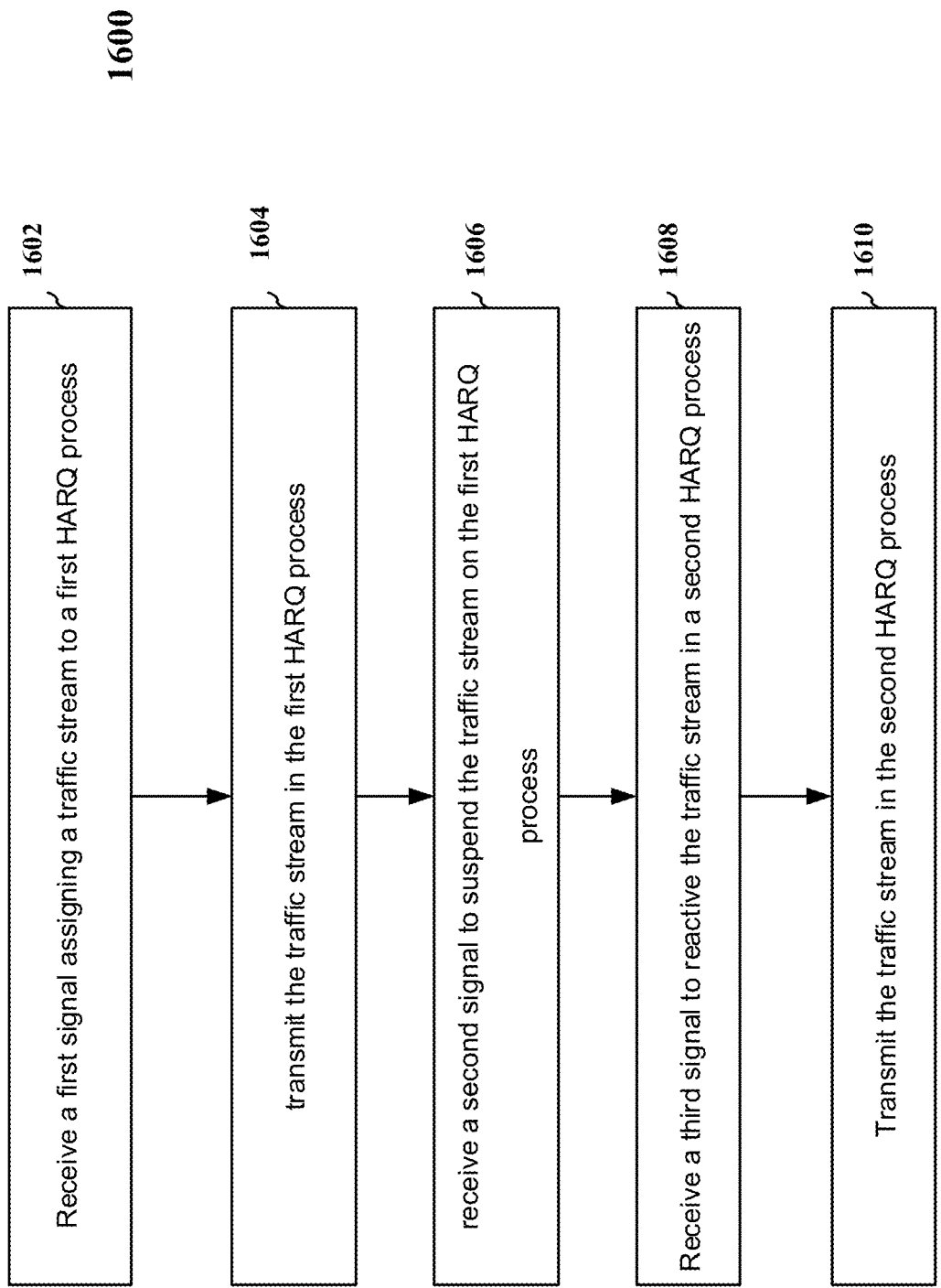
FIG. 16 illustrates a block diagram of an example of a method of dynamically enabling/disabling of a HARQ process, according to some embodiments.

FIG. 16 illustrates a block diagram 1600 of an example of a method of dynamically enabling/disabling of a HARQ process, according to some embodiments. In this method, HARQ process ID may be dynamically switched to enable multiplexing multiple traffic streams on a limited number of HARQ processes. The method shown in FIG. 16 may be used in conjunction with any of the systems, techniques, or devices shown in the above Figures, among other techniques and devices. In various embodiments, some of the method elements shown may be performed concurrently, in a different order than shown, or may be omitted. Additional method elements may also be performed as desired. As shown, this method may operate as follows.

At 1602, a wireless device, such as UE 106, may receive a first signal assigning a traffic stream to a first HARQ process. In some embodiments, the first HARQ process is a shared HARQ process, in which the UE shares a HARQ identification with other UEs.

At 1604, the wireless device may transmit the traffic stream in the first HARQ process.

At 1606, the wireless device may receive a second signal to suspend the traffic stream on the first HARQ process. In some embodiments, the traffic stream is moved to a suspended state while being suspended, and wherein a buffer of the suspended state is smaller than a HARQ buffer.

At 1608, the wireless device may receive a third signal to reactive the traffic stream in a second HARQ process.

At 1610, the wireless device may transmit the traffic stream in the second HARQ process. In some embodiments, a HARQ process identification in the second HARQ process is different than a HARQ process identification in the first HARQ process. In some embodiments, a HARQ process identification in the second HARQ process is same as a HARQ process identification in the first HARQ process.

There is a number of example embodiments described herein.

Example 1 is a user equipment device (UE), comprising: at least one antenna; at least one radio, wherein the at least one radio is configured to perform cellular communication; one or more processors coupled to the at least one radio, wherein the one or more processors and the at least one radio are configured to perform voice and/or data communications; wherein the one or more processors are configured to cause the UE to: receive a first set and a second set of hybrid automatic repeat request (HARQ) process numbers, the first set and the second set of HARQ process numbers corresponding to a first set and a second set of HARQ processes respectively, wherein each HARQ process in the first set of HARQ processes is configured to enable a HARQ feedback, and wherein each HARQ process in the second set of HARQ processes is configured to disable or enable a HARQ feedback; receive a data transmission in a HARQ process in the first set or the second set of HARQ processes; determine whether to transmit a HARQ feedback based on whether the HARQ feedback is enabled or disabled.

Example 2 is the UE of example 1 that may optionally include that a number of the first set HARQ processes is based on at least one of UE capability or data quality of service.

Example 3 is the UE of example 1 that may optionally include that the one or more processors are further configured to cause the UE to receive a radio resource control (RRC) message or a medium access control (MAC) control element (MAC CE) message, wherein each HARQ process in the second set of HARQ processes is configured to disable or enable a HARQ feedback based on the RRC message or the MAC CE message.

Example 4 is the UE of example 3 that may optionally include that the RRC message or the MAC CE message indicates a timing of the HARQ feedback being enabled or disabled.

Example 5 is the UE of example 1 that may optionally include that the one or more processors are further configured to cause the UE to receive a downlink control information (DCI), herein each HARQ process in the second set of HARQ processes is configured to disable or enable a HARQ feedback based on the DCI.

Example 6 is the UE of example 5 that may optionally include that two different radio network temporary identifiers (RNTIs) are used in the DCI to indicate whether the HARQ feedback is enabled or disabled.

Example 7 is the UE of example 5 that may optionally include that an RNTI scrambled on different positions of a DCI cyclic redundancy check (CRC) is used to indicate whether the HARQ feedback is enabled or disabled.

Example 8 is a UE comprising: at least one antenna; at least one radio, wherein the at least one radio is configured to perform cellular communication; one or more processors coupled to the at least one radio, wherein the one or more processors and the at least one radio are configured to perform voice and/or data communications; wherein the one or more processors are configured to cause the UE to: receive a configured grant configuration or a semi-persistent scheduling (SPS) configuration, the configured grant configuration or the SPS configuration including a flag indicating whether a hybrid automatic repeat request (HARQ)-based retransmission is disabled; receive a data transmission; receive a blind data retransmission; and determine whether to disable a HARQ feedback based on the flag indicating whether a HARQ-based retransmission is disabled.

Example 9 is the UE of example 8 that may optionally include that the one or more processors are further configured to cause the UE to determine to disable the HARQ feedback based on the flag indicating the HARQ-based retransmission is disabled; and release a HARQ buffer based on the determining to disable the HARQ feedback.

Example 10 is the UE of example 8 that may optionally include that an information element of the configured grant configuration or the SPS configuration includes the flag for each HARQ process associated with the configuration, indicating whether the HARQ-based retransmission is disabled.

Example 11 is a UE comprising: at least one antenna; at least one radio, wherein the at least one radio is configured to perform cellular communication; one or more processors coupled to the at least one radio, wherein the one or more processors and the at least one radio are configured to perform voice and/or data communications; wherein the one or more processors are configured to cause the UE to: receive a first set and a second set of hybrid automatic repeat request (HARQ) process numbers, the first set and the second set of HARQ process numbers corresponding to a first set and a second set of HARQ processes respectively; receive a downlink control information (DCI), wherein a radio network temporary identifier (RNTI) is scrambled with cyclic redundancy check (CRC) bits of the DCI; determine a HARQ process number in the first set or the second set of HARQ process numbers based on at least one of the RNTI or a field in the DCI.

Example 12 is the UE of example 11 that may optionally include that a HARQ process in the first set of HARQ processes has an identification number from 0 to 15, and wherein a HARQ process in the second set of HARQ processes has an identification number from 16 to 31.

Example 13 is the UE of example 11 that may optionally include that the first set or the second set of HARQ process numbers are indicated by a "HARQ process number" field in the DCI based on whether the RNTI includes a first RNTI or a second RNTI.

Example 14 is the UE of example 11 that may optionally include that the HARQ process number in the first set or the second set of HARQ process numbers is determined based on whether the RNTI includes a first RNTI or a second RNTI.

Example 15 is the UE of example 11 that may optionally include that the HARQ process number in the first set or the second set of HARQ process numbers is determined based on positions of the CRC bits with which the RNTI is scrambled.

Example 16 is the UE of example 11 that may optionally include that the HARQ process number in the first set or the second set of HARQ process numbers is determined based on a redundancy version field in the DCI.

Example 17 is the UE of example 11 that may optionally include that the HARQ process number in the first set or the second set of HARQ process numbers is determined based on a virtual resource block-to-physical resource block mapping field in the DCI.

Example 18 is a UE comprising: at least one antenna; at least one radio, wherein the at least one radio is configured to perform cellular communication; one or more processors coupled to the at least one radio, wherein the one or more processors and the at least one radio are configured to perform voice and/or data communications; wherein the one or more processors are configured to cause the UE to: receive a first signal assigning a traffic stream to a first hybrid automatic repeat request (HARQ) process; transmit the traffic stream in the first HARQ process; receive a second signal to suspend the traffic stream on the first HARQ process; receive a third signal to reactive the traffic stream in a second HARQ process; and transmit the traffic stream in the second HARQ process.

Example 19 is the UE of example 18 that may optionally include that the first HARQ process is a shared HARQ process, in which the UE shares a HARQ identification with other UEs.

Example 20 is the UE of example 18 that may optionally include that the traffic stream is moved to a suspended state while being suspended, and wherein a buffer of the suspended state is smaller than a HARQ buffer.

Example 21 is the UE of example 18 that may optionally include that a HARQ process identification in the second HARQ process is different than a HARQ process identification in the first HARQ process.

Example 22 is the UE of example 18 that may optionally include that a HARQ process identification in the second HARQ process is same as a HARQ process identification in the first HARQ process.

Example 23 is a non-transitory computer readable memory medium storing program instructions executable by processing circuitry to cause a user equipment device (UE) to: receive a first set and a second set of hybrid automatic repeat request (HARQ) process numbers, the first set and the second set of HARQ process numbers corresponding to a first set and a second set of HARQ processes respectively, wherein each HARQ process in the first set of HARQ processes is configured to enable a HARQ feedback, and wherein each HARQ process in the second set of HARQ processes is configured to disable or enable a HARQ feedback; receive a data transmission in a HARQ process in the first set or the second set of HARQ processes; and determine whether to transmit a HARQ feedback based on whether the HARQ feedback is enabled or disabled.

Example 24 is the medium of example 23 that may optionally include that a number of the first set HARQ processes is based on at least one of UE capability or data quality of service.

Example 25 is the medium of example 23 that may optionally include that the program instructions are further executable to cause the UE to receive a radio resource control (RRC) message or a medium access control (MAC) control element (MAC CE) message, wherein each HARQ process in the second set of HARQ processes is configured to disable or enable a HARQ feedback based on the RRC message or the MAC CE message.

Example 26 is the medium of example 23 that may optionally include that the program instructions are further executable to cause the UE to receive a downlink control information (DCI), wherein each HARQ process in the second set of HARQ processes is configured to disable or enable a HARQ feedback based on the DCI.

Example 27 is the medium of example 26 that may optionally include that two different radio network temporary identifiers (RNTIs) are used in the DCI to indicate whether the HARQ feedback is enabled or disabled.

Example 28 is the medium of example 26 that may optionally include that an RNTI scrambled on different positions of a DCI cyclic redundancy check (CRC) is used to indicate whether the HARQ feedback is enabled or disabled.

Example 29 is a non-transitory computer readable memory medium storing program instructions executable by processing circuitry to cause a user equipment device (UE) to: receive a configured grant configuration or a semi-persistent scheduling (SPS) configuration, the configured grant configuration or the SPS configuration including a flag indicating whether a hybrid automatic repeat request (HARQ)-based retransmission is disabled; receive a data transmission; receive a blind data retransmission; and determine whether to disable a HARQ feedback based on the flag indicating whether a HARQ-based retransmission is disabled.

Example 30 is the medium of example 29 that may optionally include that the program instructions are further executable to cause the UE to determine to disable the HARQ feedback based on the flag indicating the HARQ-based retransmission is disabled; and release a HARQ buffer based on the determining to disable the HARQ feedback.

Example 31 is the medium of example 29 that may optionally include that information element of the configured grant configuration or the SPS configuration includes the flag for each HARQ process associated with the configuration, indicating whether the HARQ-based retransmission is disabled.

Example 32 is a non-transitory computer readable memory medium storing program instructions executable by processing circuitry to cause a user equipment device (UE) to: receive a first set and a second set of hybrid automatic repeat request (HARQ) process numbers, the first set and the second set of HARQ process numbers corresponding to a first set and a second set of HARQ processes respectively; receive a downlink control information (DCI), wherein a radio network temporary identifier (RNTI) is scrambled with cyclic redundancy check (CRC) bits of the DCI; and determine a HARQ process number in the first set or the second set of HARQ process numbers based on at least one of the RNTI or a field in the DCI.

Example 33 is the medium of example 32 that may optionally include that a HARQ process in the first set of HARQ processes has an identification number from 0 to 15, and wherein a HARQ process in the second set of HARQ processes has an identification number from 16 to 31.

Example 34 is the medium of example 32 that may optionally include that the first set or the second set of HARQ process numbers are indicated by a "HARQ process number" field in the DCI based on whether the RNTI includes a first RNTI or a second RNTI.

Example 35 is the medium of example 32 that may optionally include that the HARQ process number in the first set or the second set of HARQ process numbers is determined based on whether the RNTI includes a first RNTI or a second RNTI.

Example 36 is the medium of example 32 that may optionally include that the HARQ process number in the first set or the second set of HARQ process numbers is determined based on positions of the CRC bits with which the RNTI is scrambled.

Example 37 is the medium of example 32 that may optionally include that the HARQ process number in the first set or the second set of HARQ process numbers is determined based on a redundancy version field in the DCI.

Example 38 is the medium of example 32 that may optionally include that the HARQ process number in the first set or the second set of HARQ process numbers is determined based on a virtual resource block-to-physical resource block mapping field in the DCI.

Example 39 is a non-transitory computer readable memory medium storing program instructions executable by processing circuitry to cause a user equipment device (UE) to: receive a first signal assigning a traffic stream to a first hybrid automatic repeat request (HARQ) process; transmit the traffic stream in the first HARQ process; receive a second signal to suspend the traffic stream on the first HARQ process; receive a third signal to reactive the traffic stream in a second HARQ process; and transmit the traffic stream in the second HARQ process.

Example 40 is the medium of example 39 that may optionally include that the first HARQ process is a shared HARQ process, in which the UE shares a HARQ identification with other UEs.

Example 41 is the medium of example 39 that may optionally include that the traffic stream is moved to a suspended state while being suspended, and wherein a buffer of the suspended state is smaller than a HARQ buffer.

Example 42 is the medium of example 39 that may optionally include that a HARQ process identification in the second HARQ process is different than a HARQ process identification in the first HARQ process.

Example 43 is a method of wireless communication at a user equipment device (UE), comprising: receiving a first set and a second set of hybrid automatic repeat request (HARQ) process numbers, the first set and the second set of HARQ process numbers corresponding to a first set and a second set of HARQ processes respectively, wherein each HARQ process in the first set of HARQ processes is configured to enable a HARQ feedback, and wherein each HARQ process in the second set of HARQ processes is configured to disable or enable a HARQ feedback; receiving a data transmission in a HARQ process in the first set or the second set of HARQ processes; and determining whether to transmit a HARQ feedback based on whether the HARQ feedback is enabled or disabled.

Example 44 is a method of wireless communication at a user equipment device (UE), comprising receiving a configured grant configuration or a semi-persistent scheduling (SPS) configuration, the configured grant configuration or the SPS configuration including a flag indicating whether a hybrid automatic repeat request (HARQ)-based retransmission is disabled; receiving a data transmission; receiving a blind data retransmission; and determining whether to disable a HARQ feedback based on the flag indicating whether a HARQ-based retransmission is disabled.

Example 45 is a method of wireless communication at a user equipment device (UE), comprising: receiving a first set and a second set of hybrid automatic repeat request (HARQ) process numbers, the first set and the second set of HARQ process numbers corresponding to a first set and a second set of HARQ processes respectively; receiving a downlink control information (DCI), wherein a radio network temporary identifier (RNTI) is scrambled with cyclic redundancy check (CRC) bits of the DCI; and determining a HARQ process number in the first set or the second set of HARQ process numbers based on at least one of the RNTI or a field in the DCI.

Example 46 is a method of wireless communication at a user equipment device (UE), comprising: receiving a first signal assigning a traffic stream to a first hybrid automatic repeat request (HARQ) process; transmitting the traffic stream in the first HARQ process; receiving a second signal to suspend the traffic stream on the first HARQ process; receiving a third signal to reactive the traffic stream in a second HARQ process; and transmitting the traffic stream in the second HARQ process.

Example 47 is an apparatus, comprising: a memory; at least one processor in communication with the memory, wherein the at least one processor is configured to: generate a first set and a second set of hybrid automatic repeat request (HARQ) process numbers, the first set and the second set of HARQ process numbers corresponding to a first set and a second set of HARQ processes respectively, wherein each HARQ process in the first set of HARQ processes is configured to enable a HARQ feedback, and wherein each HARQ process in the second set of HARQ processes is configured to disable or enable a HARQ feedback; and transmit a data transmission in a HARQ process in the first set or the second set of HARQ processes.

Example 48 is the apparatus of example 47 that may optionally include that a number of the first set HARQ processes is based on at least one of UE capability or data quality of service.

Example 49 is an apparatus, comprising: a memory; at least one processor in communication with the memory, wherein the at least one processor is configured to: generate a configured grant configuration or a semi-persistent scheduling (SPS) configuration, the configured grant configuration or the SPS configuration including a flag indicating whether a hybrid automatic repeat request (HARQ)-based retransmission is disabled; transmit a data transmission; and transmit a blind data retransmission.

Example 50 is an apparatus, comprising: a memory; at least one processor in communication with the memory, wherein the at least one processor is configured to: generate a first set and a second set of hybrid automatic repeat request (HARQ) process numbers, the first set and the second set of HARQ process numbers corresponding to a first set and a second set of HARQ processes respectively; and transmit a downlink control information (DCI), wherein a radio network temporary identifier (RNTI) is scrambled with cyclic redundancy check (CRC) bits of the DCI.

Example 51 is the apparatus of example 50 that may optionally include that a HARQ process in the first set of HARQ processes has an identification number from 0 to 15, and wherein a HARQ process in the second set of HARQ processes has an identification number from 16 to 31.

Example 52 is the apparatus of example 50 that may optionally include that the first set or the second set of HARQ process numbers are indicated by a "HARQ process number" field in the DCI based on whether the RNTI includes a first RNTI or a second RNTI.

Example 53 is an apparatus, comprising: a memory; at least one processor in communication with the memory, wherein the at least one processor is configured to: transmit a first signal assigning a traffic stream to a first hybrid automatic repeat request (HARQ) process; receive the traffic stream in the first HARQ process; transmit a second signal to suspend the traffic stream on the first HARQ process; transmit a third signal to reactive the traffic stream in a second HARQ process; and receive the traffic stream in the second HARQ process.

Example 54 is the apparatus of example 53 that may optionally include that the first HARQ process is a shared HARQ process, in which the UE shares a HARQ identification with other UEs.

Example 55 is the apparatus of example 53 that may optionally include that a HARQ process identification in the second HARQ process is different than a HARQ process identification in the first HARQ process.

Example 56 is a non-transitory computer readable memory medium storing program instructions executable by processing circuitry to cause an apparatus to: generate a first set and a second set of hybrid automatic repeat request (HARQ) process numbers, the first set and the second set of HARQ process numbers corresponding to a first set and a second set of HARQ processes respectively, wherein each HARQ process in the first set of HARQ processes is configured to enable a HARQ feedback, and wherein each HARQ process in the second set of HARQ processes is configured to disable or enable a HARQ feedback; and transmit a data transmission in a HARQ process in the first set or the second set of HARQ processes.

Example 57 is a non-transitory computer readable memory medium storing program instructions executable by processing circuitry to cause an apparatus to: generate a configured grant configuration or a semi-persistent scheduling (SPS) configuration, the configured grant configuration or the SPS configuration including a flag indicating whether a hybrid automatic repeat request (HARQ)-based retransmission is disabled; transmit a data transmission; and transmit a blind data retransmission.

Example 58 is a non-transitory computer readable memory medium storing program instructions executable by processing circuitry to cause an apparatus to: generate a first set and a second set of hybrid automatic repeat request (HARQ) process numbers, the first set and the second set of HARQ process numbers corresponding to a first set and a second set of HARQ processes respectively; and transmit a downlink control information (DCI), wherein a radio network temporary identifier (RNTI) is scrambled with cyclic redundancy check (CRC) bits of the DCI.

Example 59 is a non-transitory computer readable memory medium storing program instructions executable by processing circuitry to cause an apparatus to: transmit a first signal assigning a traffic stream to a first hybrid automatic repeat request (HARQ) process; receive the traffic stream in the first HARQ process; transmit a second signal to suspend the traffic stream on the first HARQ process; transmit a third signal to reactivate the traffic stream in a second HARQ process; and receive the traffic stream in the second HARQ process.

Example 60 is a method of wireless communication at a base station, comprising: generating a first set and a second set of hybrid automatic repeat request (HARQ) process numbers, the first set and the second set of HARQ process numbers corresponding to a first set and a second set of HARQ processes respectively, wherein each HARQ process in the first set of HARQ processes is configured to enable a HARQ feedback, and wherein each HARQ process in the second set of HARQ processes is configured to disable or enable a HARQ feedback; and transmitting a data transmission in a HARQ process in the first set or the second set of HARQ processes.

Example 61 is a method of wireless communication at a base station, comprising: generating a configured grant configuration or a semi-persistent scheduling (SPS) configuration, the configured grant configuration or the SPS configuration including a flag indicating whether a hybrid automatic repeat request (HARQ)-based retransmission is disabled; transmitting a data transmission; and transmitting a blind data retransmission.

Example 62 is a method of wireless communication at a base station, comprising: generating a first set and a second set of hybrid automatic repeat request (HARQ) process numbers, the first set and the second set of HARQ process numbers corresponding to a first set and a second set of HARQ processes respectively; and transmitting a downlink control information (DCI), wherein a radio network temporary identifier (RNTI) is scrambled with cyclic redundancy check (CRC) bits of the DCI.

Example 63 is a method of wireless communication at a base station, comprising: transmitting a first signal assigning a traffic stream to a first hybrid automatic repeat request (HARQ) process; receiving the traffic stream in the first HARQ process; transmitting a second signal to suspend the traffic stream on the first HARQ process; transmitting a third signal to reactivate the traffic stream in a second HARQ process; and receiving the traffic stream in the second HARQ process.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment device (UE), comprising:
at least one antenna;
at least one radio, wherein the at least one radio is configured to perform cellular communication;
one or more processors coupled to the at least one radio, wherein the one or more processors and the at least one radio are configured to perform voice and/or data communications, wherein the one or more processors are configured to cause the UE to:
receive a first set and a second set of hybrid automatic repeat request (HARQ) process numbers, the first set and the second set of HARQ process numbers corresponding to a first set and a second set of HARQ processes respectively;
receive a downlink control information (DCI), wherein a radio network temporary identifier (RNTI) is scrambled with cyclic redundancy check (CRC) bits of the DCI, wherein a HARQ process number field in the DCI indicates a HARQ process that belongs to both the first set and the second set of HARQ process numbers; and
determine a HARQ process number in the first set or the second set of HARQ process numbers based on the HARQ process number field in the DCI and at least one of the RNTI or a second field in the DCI.

2. The UE of claim 1, wherein a HARQ process in the first set of HARQ processes has an identification number from 0 to 15, and wherein a HARQ process in the second set of HARQ processes has an identification number from 16 to 31.

3. The UE of claim 1, wherein the first set or the second set of HARQ process numbers are indicated by the "HARQ process number" field in the DCI based on whether the RNTI includes a first RNTI or a second RNTI.

4. The UE of claim 1, wherein the HARQ process number in the first set or the second set of HARQ process numbers is determined based on whether the RNTI includes a first RNTI or a second RNTI.

5. The UE of claim 1, wherein the HARQ process number in the first set or the second set of HARQ process numbers is determined based on positions of the CRC bits with which the RNTI is scrambled.

6. The UE of claim 1, wherein the HARQ process number in the first set or the second set of HARQ process numbers is determined based on a redundancy version field in the DCI.

7. The UE of claim 1, wherein the HARQ process number in the first set or the second set of HARQ process numbers is determined based on a virtual resource block-to-physical resource block mapping field in the DCI.

8. A baseband processor of a device, the baseband processor is configured to execute instructions stored in a memory of the device to perform operations comprising:
receive a first set and a second set of hybrid automatic repeat request (HARQ) process numbers, the first set and the second set of HARQ process numbers corresponding to a first set and a second set of HARQ processes respectively;
receive a downlink control information (DCI), wherein a radio network temporary identifier (RNTI) is scrambled with cyclic redundancy check (CRC) bits of the DCI, wherein a HARQ process number field in the DCI indicates a HARQ process that belongs to both the first set and the second set of HARQ process numbers; and
determine a HARQ process number in the first set or the second set of HARQ process numbers based on the HARQ process number field in the DCI and at least one of the RNTI or a second field in the DCI.

9. The baseband processor of claim 8, wherein a HARQ process in the first set of HARQ processes has an identification number from 0 to 15, and wherein a HARQ process in the second set of HARQ processes has an identification number from 16 to 31.

10. The baseband processor of claim 8, wherein the first set or the second set of HARQ process numbers are indicated by the "HARQ process number" field in the DCI based on whether the RNTI includes a first RNTI or a second RNTI.

11. The baseband processor of claim 8, wherein the HARQ process number in the first set or the second set of HARQ process numbers is determined based on whether the RNTI includes a first RNTI or a second RNTI.

12. The baseband processor of claim 8, wherein the HARQ process number in the first set or the second set of HARQ process numbers is determined based on positions of the CRC bits with which the RNTI is scrambled.

13. The baseband processor of claim 8, wherein the HARQ process number in the first set or the second set of HARQ process numbers is determined based on a redundancy version field in the DCI.

14. The baseband processor of claim 8, wherein the HARQ process number in the first set or the second set of HARQ process numbers is determined based on a virtual resource block-to-physical resource block mapping field in the DCI.

15. A method of wireless communication at a user equipment device (UE), comprising:
receiving a first set and a second set of hybrid automatic repeat request (HARQ) process numbers, the first set and the second set of HARQ process numbers corresponding to a first set and a second set of HARQ processes respectively;
receiving a downlink control information (DCI), wherein a radio network temporary identifier (RNTI) is scrambled with cyclic redundancy check (CRC) bits of the DCI, wherein a HARQ process number field in the DCI indicates a HARQ process that belongs to both the first set and the second set of HARQ process numbers; and
determining a HARQ process number in the first set or the second set of HARQ process numbers based on the HARQ process number field in the DCI and at least one of the RNTI or a second field in the DCI.

16. The method of claim 15, wherein a HARQ process in the first set of HARQ processes has an identification number from 0 to 15, and wherein a HARQ process in the second set of HARQ processes has an identification number from 16 to 31.

17. The method of claim 15, wherein the first set or the second set of HARQ process numbers are indicated by the "HARQ process number" field in the DCI based on whether the RNTI includes a first RNTI or a second RNTI.

18. The method of claim 15, wherein the HARQ process number in the first set or the second set of HARQ process numbers is determined based on whether the RNTI includes a first RNTI or a second RNTI.

19. The method of claim 15, wherein the HARQ process number in the first set or the second set of HARQ process numbers is determined based on positions of the CRC bits with which the RNTI is scrambled.

20. The method of claim 15, wherein the HARQ process number in the first set or the second set of HARQ process numbers is determined based on a redundancy version field in the DCI.

* * * * *